(12) United States Patent
Froger et al.

(10) Patent No.: US 6,351,716 B1
(45) Date of Patent: Feb. 26, 2002

(54) METHOD AND DEVICE FOR DETERMINING THE QUANTITY OF PRODUCT CONTAINED IN A RESERVOIR, FOR EXAMPLE IN AN INK RESERVOIR FOR A PRINTER

(75) Inventors: Marie-Hélène Froger, Chateaugiron; Pascal Coudray, La Chapelle des Fougeretz; Mickaël Lorgeoux, Rennes, all of (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/168,717

(22) Filed: Oct. 9, 1998

(30) Foreign Application Priority Data

Oct. 10, 1997 (FR) ............................................. 97 12721
Oct. 10, 1997 (FR) ............................................. 97 12720

(51) Int. Cl.$^7$ ................................................ B41J 2/195
(52) U.S. Cl. ........................................... 702/73; 347/7
(58) Field of Search ............................... 702/73; 347/7; 73/304 C

(56) References Cited

U.S. PATENT DOCUMENTS

| | | | | |
|---|---|---|---|---|
| 4,202,267 A | * | 5/1980 | Heinzl et al. | 101/364 |
| 4,229,716 A | | 10/1980 | Levi | 333/28 R |
| 5,682,184 A | * | 10/1997 | Stephany et al. | 347/7 |
| 5,788,388 A | * | 8/1998 | Cowger et al. | 400/703 |
| 6,022,090 A | * | 2/2000 | Coudray et al. | 347/7 |
| 6,089,688 A | * | 7/2000 | Froger et al. | 347/7 |
| 6,095,629 A | * | 8/2000 | Froger et al. | 347/7 |
| 6,164,132 A | * | 12/2000 | Matulek | 73/304 C |
| 6,164,744 A | * | 12/2000 | Froger et al. | 347/7 |
| 6,178,818 B1 | * | 1/2001 | Plochinger | 73/304 C |

FOREIGN PATENT DOCUMENTS

| | | |
|---|---|---|
| DE | 3043810 | 6/1982 |
| EP | 28399 | 5/1981 |
| EP | 261353 | 3/1988 |

* cited by examiner

*Primary Examiner*—Patrick Assouad
(74) *Attorney, Agent, or Firm*—Fitzpatrick, Cella, Harper & Scinto

(57) ABSTRACT

Determining the quantity of an electrically conductive product contained in a reservoir made of electrically insulating material having at least one storage cavity. A resonant circuit is formed, including a capacitive arrangement formed at least part from the reservoir. A measurement procedure is defined according to which a plurality of excitation signals are applied to the resonant circuit having different frequencies, and a plurality of measurement signals are made. A processing procedure is defined which identifies the instantaneous resonant frequency of the resonant circuit, measures the width, for a given amplitude level, of the resonance peak, and derives therefrom an item of information representing the quantity of product contained in the storage cavity. At least one determination cycle is effected, consisting of triggering the measurement procedure and the processing procedure, and capturing the instantaneous value of the item of information.

73 Claims, 12 Drawing Sheets

METHOD AND DEVICE FOR DETERMINING THE QUANTITY OF PRODUCT CONTAINED IN A RESERVOIR, FOR EXAMPLE IN AN INK RESERVOIR FOR A PRINTER

The invention concerns a method and a device for determining the quantity of product contained in a reservoir, for example in an ink reservoir for a printer.

In known printing devices, methods have already been proposed for detecting the residual quantity of available ink (this is then sometimes referred to as ink level monitoring or detection).

By way of example the document EP-A2-0 028 399 describes an ink level detection method using an resonant circuit with which the reservoir to be monitored is integrated. More precisely, the capacitor of this resonant circuit has two metal plates forming electrodes defining a dielectric space in which the storage cavity of the ink reservoir is situated.

The ink thus behaves as a dielectric whose value changes as the ink reserve decreases. Consequently the capacitance of the resonant circuit also changes.

The latter is calibrated so that its resonant frequency, and therefore the maximum voltage at its resistor, is reached when the level of the ink reserve has dropped to a predetermined value. When this threshold is passed, a signal is activated.

This method has a certain number of defects.

First of all, when the ink level decreases, the voltage at the terminals of the resistor varies up to a certain threshold. The only information given by this device is therefore an indication on the situation (above or below) of the ink level with respect to the said threshold.

Only the information relating to the amplitude of the measurement signal is taken into account and compared with a threshold; this type of detector indicates only one type of information: when there is 20% of the ink remaining in the reservoir. By using an analogue to digital converter, it would be possible to think of determining the level of ink in the reservoir continuously, but this type of component has a high cost.

In addition, when it is wished to measure the quantity of ink present in small reservoirs or when the capacitance is of low value (a few picofarads), the resonant frequency then becomes extremely high, which appreciably increases the cost of the components used and may generate electromagnetic interference or disturbances. One solution would consist of using inductors of very high value (1 henry for example). These would reduce the frequency, but they are very difficult to produce and in any case are bulky.

It is briefly mentioned in this document that it is possible to use a parallel circuit but it is added that a series circuit is preferable; in any event everything which is described and shown concerns a series circuit.

The ink plotters such as the one mentioned in the description of EP-A-0028399 have a reservoir and a recorder. The reservoir and recorder are not electrically connected to the printing device, which of course makes it possible to place the capacitor consisting of metal plates and ink reservoir in either a series or a parallel configuration.

The same applies to conventional wound inductors, which can be placed equally well in a series or parallel configuration.

It must nevertheless be noted that:

if the recorder is for example connected to a potential, for example earth, the series resonant circuit cannot be produced; this case is however increasingly usual;

if the capacitance is very small, it is necessary to produce inductors with very high values if it is desired to remain within low frequencies, which cannot be achieved in conventional technologies.

A first object of the invention is to mitigate the drawbacks of the known solutions by virtue of a method or device which makes it possible to detect, preferably at least within an operating range preferably including the low values, the residual quantity of an electrically conductive product contained in a reservoir made of an electrically insulating material in a simple and reliable fashion, by identifying an easily measurable characteristic of a resonant circuit including the reservoir, without having to modify the latter in any way, without for all that using expensive components in the processing of the measurement signals.

An other object of the invention (but these aspects can be taken into consideration independently of each other and of the aforementioned object) is to detect the residual quantity of an electrically conductive product contained in a reservoir made of an electrically insulating material in a simple and reliable manner:

even when the technological constraints of location and operation of the system receiving the reservoir allow the formation only of a resonant circuit of the parallel type (in particular when the reservoir includes, or cooperates with, a print head whose operation requires an electrical connection of the said head to a predetermined potential, which prevents any series connection);

at a moderate cost and within a moderate size, in particular without using components which are difficult to produce and/or expensive in the resonant circuit itself or in the generator designed to deliver excitation signals to this resonant circuit);

which easily allows, by means of minor adaptations, the detection also of situations where there is no product in the duct through which the product flows to the print or ejection head (therefore minimizing the additional components to be provided when it is desired not only to detect the quantity of product in the storage chamber but also to check, in real time, that there is indeed, in the delivery duct, product in a normal state, that is to say electrically conductive).

To this end the invention first proposes a method of determining the quantity of an electrically conductive product contained in a reservoir made of electrically insulating material having at least one storage cavity, according to which:

a resonant circuit is formed having a capacitive arrangement comprising at least part of this reservoir;

this resonant circuit is connected to an excitation signal generator;

a measurement procedure is defined according to which a plurality of excitation signals is applied to this resonant circuit having different frequencies included in a predetermined frequency range and a plurality of measurement signals are taken off at a measuring point in response to these excitation signals, this frequency range being chosen so as to contain the frequencies at which the resonant circuit is in resonance for a plurality of values of the quantity of product within a predetermined operating range;

a processing procedure is defined consisting of identifying the instantaneous resonant frequency of the resonant circuit from this plurality of measurement signals, measuring the width, for a given amplitude level, of the resonance peak and deriving therefrom an item of information representing the quantity of product contained in the storage cavity, this amplitude level being chosen so that there exists a univocal correlation law between the width of the resonance peak and this item of information when the quantity of product is within the said operating range;

at least one determination cycle is effected, consisting of triggering the measurement procedure and the processing procedure, and capturing the instantaneous value of the said item of information.

It may be appreciated that the invention thus makes provision for detecting the resonant frequency of a resonant circuit in which a capacitive element consists of at least part of the reservoir, which is easy to achieve at a moderate cost, and to derive a value representing the residual quantity of product from the width of the resonance peak, which requires only the use of a simple comparator, of a cost very much less than that of an analogue to digital converter. However, it became clear that it was possible, for electrically conductive products, notably printing inks, to establish a univocal correlation law between the width of such a resonance peak and the quantity of product at which resonance occurs.

One of the possible sources of cost in implementing the method of the invention lies in the need to be able to generate excitation signals able to result in measurement signals of sufficiently high amplitude to lend themselves to effective and precise use; in other words it is necessary to be able to generate signals at frequencies close to the resonant frequency. Preferably, when possible, the invention is implemented within the range of low or medium frequencies (between approximately 1 kHz and approximately 100 kHz). This can sometimes be achieved easily, having regard to the nature of the product and the geometry and dimensions of the reservoir, using conventional components to produce the resonant circuit.

In the field of printing machines it was seen that the capacitance values typically encountered with ink reservoirs led on the other hand to resonant frequencies in the high-frequency field (beyond around 1 megahertz), unless it was possible to use any inductors of very high values which, when they exist, are very expensive.

The advantage of using, according to a preferred characteristic of the invention, a notional inductor is that it is possible to simulate high-value inductors easily without using components which are complex or difficult to produce. A so-called "gyrator" circuit is thus known which, with a few resistors and two amplifiers, makes it possible to simulate a high constant inductance using a constant capacitance of conventional value (typically around scarcely a few picofarads) of moderate cost and bulk. However, it became clear that installing such resistors and such amplifiers entailed in itself only a moderate increase in cost and bulk, so that such a gyrator lent itself very well, in spite of appearances, to forming notional inductors of high value at a cost and within an overall bulk which were entirely moderate, including when operating in the field of office printing machines.

It is consequently easy to design the resonant circuit so that it has an average resonant frequency (between around 1 kHz and around 100 kHz), and so that the excitation signals necessary for detecting the quantity of product can therefore be generated very easily at a moderate cost.

Preferably, the capacitive arrangement of which the reservoir (or a part thereof) forms part is distinct from the notional inductor.

It may be noted that the method lends itself very well to a parallel connection of the capacitive and inductive components of the resonant circuit, which makes it applicable to any type of reservoir, whatever the type of associated ejection or print heads. For reasons of simplicity or to meet operating constraints, these components are advantageously connected between a measuring point and earth.

When the reservoir has several storage cavities in series, the method of the invention can be applied to monitor one or more of these cavities. In particular, when the reservoir has a first cavity containing a porous body and a second cavity communicating with the delivery duct through the first cavity, it may be preferred to dispose the electrode designed to be in the immediate vicinity of the chamber of the reservoir opposite at least part of this second cavity: thus the residual quantity of product is monitored in the whole of the reservoir. It is of course possible to monitor only part of the reservoir by disposing for example the aforementioned electrode opposite the first cavity.

Preferably, the capacitive arrangement includes two metallic parts forming the electrodes of a capacitor, one of which is disposed in the immediate vicinity of and opposite a portion of the storage chamber of the reservoir, and the other one of which is formed by, or connected to, an ejection or print head connected to the storage chamber by a connecting or delivery duct, by virtue of which the capacitive arrangement takes account not only of the quantity of product in the chamber but also in the connecting duct. Such an assembly makes it possible to add, to the parts necessary for the operation of the head, only a single metal part.

The operation of certain print heads currently known makes it necessary for the latter to be connected to earth: this is why it is may be preferred, or even necessary, the resonant circuit then being of the parallel type, for the print or ejection head to be connected to a reference potential formed by earth.

The invention applies notably to the case of printing machines using a reservoir, generally removable, containing an electrically conductive ink: the resonant circuit, including the first electrode, is then advantageously fixed with respect to the casing of the printing machine.

It is very easy to adapt the method of the invention for monitoring the state of the product in the delivery duct, whether there is a lack of it, or whether it dries up, notably. The characteristics of the capacitor formed by the reservoir between the electrode and the print head are then fundamentally modified, leading in practice to values of the characteristic (or of the measurement signal) which are entirely different from the values which can normally be obtained: it suffices to provide for a test in this regard and an abnormality procedure (excitation of an audible or light signal for example) to be triggered as appropriate.

It is clear that the information concerning the quantity of product can be of at least two natures, depending on whether concern is with the quantity already consumed or the residual quantity.

The choice of the amplitude threshold at which the width of the resonance peak is determined has an influence on the operating range within which it is desired to monitor the change in the quantity of product. When the amplitude at the resonance increases as the residual quantity of product decreases, it is found that the width of the peak also increases, and, the more the threshold represents a high percentage of the maximum amplitude at the resonance for a substantially empty reservoir, the narrower the operating range, close to very low values. Preferably, the threshold is chosen so that the operating range contains at least values of the quantity of product representing from 0% to 60% of the maximum quantity of product (the aim is then to measure the variation in ink level in the critical range corresponding to the end of the cartridge as far as 0%). The level of the amplitude threshold is preferably chosen to as to be equal to approximately 50% of the maximum possible amplitude of the resonance peak (that is to say for an "empty" reservoir with a minimum quantity of product).

The excitation signals are preferably alternating signals, but can also, in a variant, be square-wave or pulsed signals.

The invention also proposes, for implementing this first method, a device for determining the quantity of an electrically conductive product contained in a reservoir made of electrically insulating material, having:

a resonant circuit including a capacitive arrangement designed to comprise at least part of this reservoir, this circuit having, for various possible values of the quantity of product contained in a given operating range, resonant frequencies contained within a predetermined frequency range;
  an excitation signal generator connected to the resonant circuit and adapted to generate various frequencies belonging to this predetermined range;
  measurement and processing means connected to this resonant circuit and to the excitation signal generator and designed so as to apply to the resonant circuit a plurality of excitation signals having various frequencies within the said predetermined range, to detect a measurement signal in response to each excitation signal, and to measure the width, for a given amplitude level, of the resonance peak and to derive therefrom an item of information representing the quantity of product contained in the storage cavity, this amplitude being chosen so that there exists a univocal correlation law between the width of the resonance peak and this information when the quantity of product is within the said operating range; and
  means for capturing the instantaneous value of the said information.

The invention also proposes a method of determining the quantity of an electrically conductive product contained in a reservoir made of electrically insulating material, this reservoir having a storage chamber and a product delivery duct and being provided with an electrically conductive ejection head connected to this duct, according to which:

a resonant circuit is formed, having an arm including a capacitor comprising at least part of this reservoir and an arm including a notional inductor, these arms being connected in parallel between a measuring point and a reference potential, this capacitor having two conductive elements forming electrodes, one of which is in the immediate vicinity of a zone of the storage chamber and the other one of which is formed by the said ejection head;
  this resonant circuit is connected to an excitation signal generator;
  a measurement procedure is defined, according to which at least one excitation signal is applied to this resonant circuit and a measuring signal is taken off the point of measurement in response to each excitation signal;
  a processing procedure is defined, consisting of identifying a characteristic of the resonant circuit from this measurement signal or signals and deriving therefrom an item of information representing the quantity of product contained in the storage cavity, this characteristic being chosen so that there is a univocal correlation law between this characteristic and this information;
  at least one determination cycle is effected, consisting of triggering the measurement procedure and the processing procedure, and capturing the instantaneous value of the said item of information.

It may be noted that the method provides for a resonant circuit whose capacitor and inductor are connected in parallel, which makes it applicable to any type of reservoir and any type of ejection or print head.

Most of the above comments apply here.

The characteristic of the resonant circuit from which according to the invention there is a derived a measurement of the quantity of product contained in the reservoir can be the amplitude of the measurement signal obtained for a fixed frequency. This is because, in order to ensure that this amplitude varies univocally over a wide range of values of the quantity of product, it is preferable for this frequency to be substantially equal to the resonant frequency of the resonant circuit when the quantity of product is extreme, that is to say preferably maximum or possibly minimum. This is because, the lower the quantity of product, the higher the resonant frequency, but the higher this frequency, the lower the amplitude of the resonant frequency: the choice of a fixed frequency close to the resonant frequency for an extreme value of the quantity of product guarantees that the instantaneous resonant frequency of the circuit remains constantly either less than or greater than this fixed frequency.

It may nevertheless turn out to be more precise to seek to be positioned, at each measurement, at the instantaneous resonant frequency of the resonant circuit since the amplitude of the measurement signal is at a maximum there (for a given quantity of product). However, it appeared that the resonant frequency varied univocally with the quantity of product: it is therefore possible to choose the instantaneous resonant frequency as a characteristic of the resonant circuit. However, it appeared that the amplitude at the resonance also varied univocally as a function of the quantity of product: this amplitude can therefore also be chosen as a characteristic of the resonant circuit. It then suffices to provide for the measurement procedure to include a preliminary step consisting of identifying a range in which the resonant frequency of the resonant circuit varies when the quantity of product varies, and for various measurement signals to be taken off for various frequencies of this range; the frequency at which the amplitude of the measurement signal has a maximum value is taken as a measurement of the instantaneous resonant frequency whilst the amplitude at this frequency is taken as a measurement of the amplitude at the resonance.

The functioning of certain print heads currently known requires these to be connected to earth; this is why it may be preferred, or even required, for the reference potential to which the print or ejection head is connected should be that of earth. It is clear that the means for earthing the ejection head may be any means, more especially as, as has just been noted, this connection of part of the head to earth is already often effected independently of the invention.

The invention also proposes, for implementing the method, a device for determining the quantity of an electrically conductive product contained in a reservoir made of electrically insulating material, this reservoir having a storage chamber and a product delivery duct and being provided with an electrically conductive ejection head connected to this duct, having:

a resonant circuit having a first arm designed to include at least part of the reservoir and a second arm including a notional inductor, these arms being connected in parallel between a measurement point and a reference potential, this first arm having an electrical conductor disposed in the immediate vicinity of a zone of the storage chamber and a means for connecting the said ejection head to the reference potential, this first electrical conductor and this ejection head defining a dielectric space containing at least part of the storage chamber and the delivery duct and thus forming a capacitor;

an excitation signal generator connected to the resonant circuit;

measurement and processing means connected to the said measurement point and to the excitation signal generator and designed so as to apply at least one excitation signal to the resonant circuit, to detect a measurement signal in response to each excitation signal, to identify a characteristic of the resonant circuit from this measurement signal or signals and to derive therefrom an item of information representing the quantity of product contained in the storage cavity, this characteristic being chosen so that there is a univocal correlation law between this characteristic and this item of information;

means for capturing the instantaneous value of the said item of information.

The same comments as before apply to the device thus defined.

The invention also concerns a signal processing device formed by measurement and processing means and means for capturing the instantaneous value of the information sought.

The invention applies finally to:

a product supply device combining a device for determining the quantity of product with the reservoir and the means of controlling the ejection head;

the particular case, important in practice, where this product supply device is an image forming device;

a printing system including only the device for determining the quantity of product with the reservoir, in the case of an ink reservoir;

an office machine including any one of the aforementioned devices; and an office signal processing unit designed to cooperate with an ink reservoir and including a processing device of the aforementioned type;

a means, fixed or partially or totally removable, of storing information which can be read by a computer or microprocessor storing instructions of a computer program, characterised in that it enables the methods of the invention as briefly disclosed to be implemented, and a means, fixed or partially or totally removable, of storing information, which can be read by a computer or a microprocessor storing data resulting from the implementation of the methods as briefly disclosed above.

It will be appreciated that the invention makes it possible notably:

to establish a univocal relationship between the quantity of ink remaining in the reservoir and the frequency band at which the voltage is above a predetermined threshold (or a univocal relationship, approximately linear, between the remaining quantity and the resonant frequency of the RLC circuit, in the case of the second method);

to detect at what moment there is no ink in the pipe, since the delivery channel is situated in the dielectric space defined by the metal parts;

to produce a level-measurement system integrated into the print device and requiring no modification to the ink cartridge;

to reduce the bulk of the mechanical configuration by using the print head as the second plate of the capacitor;

to use low frequencies by using a circuit of the gyrator type as an inductor.

Objects, characteristics and advantages of the invention will emerge from the description which had been given by way of example with regard to the accompanying drawings in which.

Figure 1:
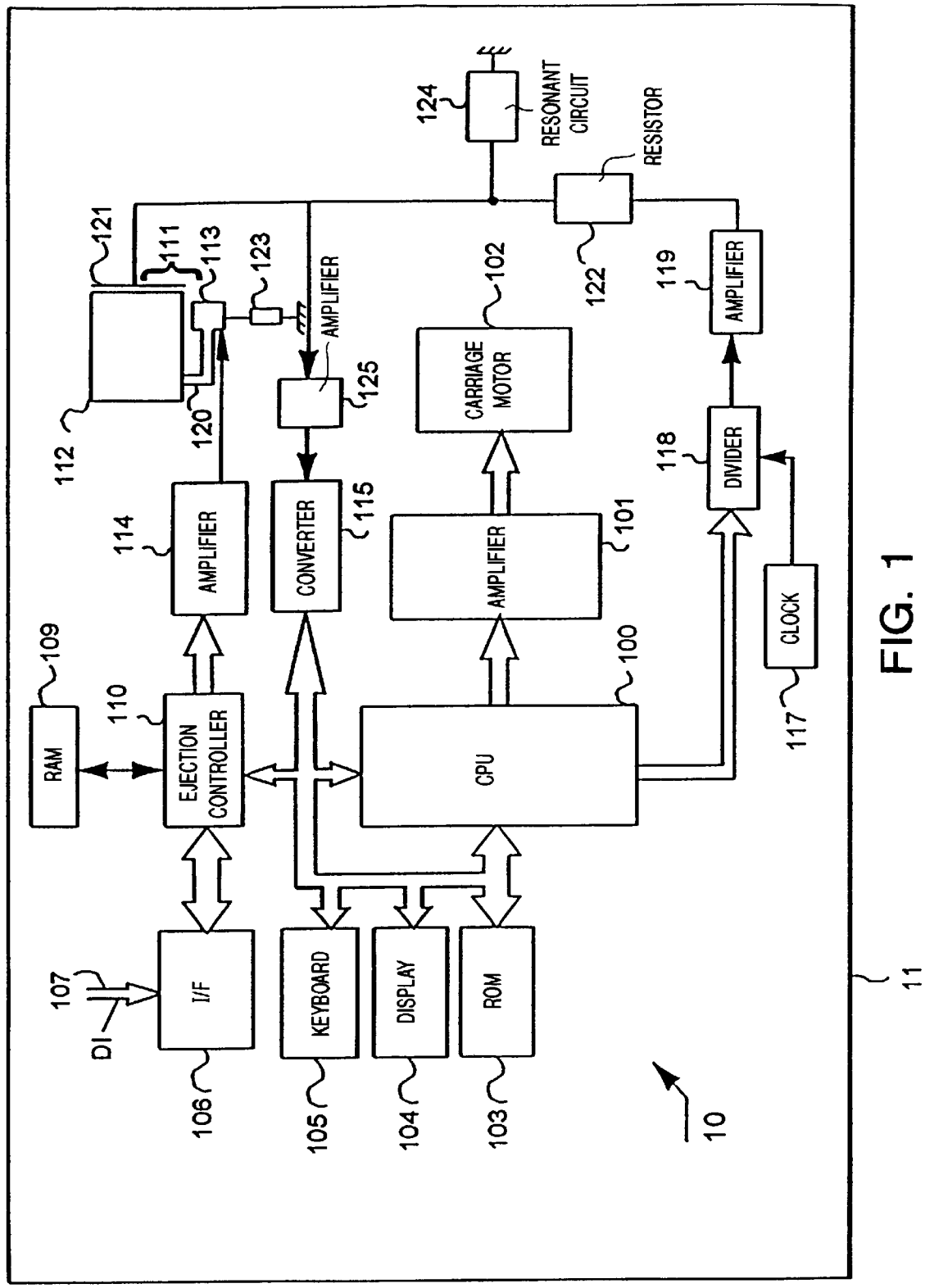
FIG. 1 is a block diagram of the printing device.

As is clear from FIG. 1, the invention applies to an image transfer device 10, for example included in a printer 11 which receives data to be printed D1 by means of a parallel input/output port 107 connected to an interface circuit 106. The circuit 106 is connected to an ink ejection control circuit 110 which controls an ink cartridge or reservoir 111, via an amplification circuit 114.

The ink cartridge 111 is exchangeable and is mounted on a reciprocating carriage actuated by a motor 102.

The ink cartridge comprises essentially an ink storage chamber 112, a delivery pipe or duct 120 connecting the print head 113 to an outlet of the chamber 112. The reservoir is made from electrically insulating material (plastic) and contains electrically conductive ink.

The printer also includes a main data processing circuit 100, associated with a read only memory 103 and a random access memory 109. The read only memory 103 contains the operating programs for the main processing circuit 100, whilst the random access memory 109, also associated with the ink ejection control circuit 110, temporarily stores the data D1 received by means of the interface 106 as well as the data processed by the main processing circuit 100.

The main processing circuit 100 is connected to a display 104, on which the main processing circuit 100 controls the display of messages representing the operation of the printer. The main processing circuit 100 is connected to a keyboard 105, incorporating at least one switch, by means of which the user can transmit operating controls to the printer.

The processing circuit 100 is also connected to the motor 102 by means of an amplification circuit 101. The motor 102 moves the carriage which carries the print cartridge 111. The motor 102 is for example a stepping motor. The printer described above is conventional and well known to persons skilled in the art. It will therefore not be detailed any further.

According to the invention, the printer has a metal plate 121 outside the plastic reservoir. A second metal plate forms, with this first plate, a dielectric space in which is situated at least part of the chamber so as to form a capacitor. This second plate is advantageously formed by the print head, which consists of an insulating layer and then a conductive layer, so that, in the example described, the pipe or duct 120 is also contained within the dielectric space. Thus at least part of this reservoir forms part of a capacitive arrangement. The latter forms part of a resonant circuit (see below).

The printer also comprises a means 115 for converting the electrical signal from the plate 121, via an amplifier 125 of low input capacitance, into a signal representing the ink level.

The main processing circuit 100 is connected to a programmable divider 118 adapted to divide the signal from a clock 117 by a variable ratio, by virtue of which a frequency scanning is obtained simply by modifying the division ratio. This signal is amplified at 119.

It is next connected to a resistive element 112, in the case in question a resistance of 4.7 MΩ, and then connected to the resonant circuit consisting of a so-called "gyrator" circuit 124 and the capacitor formed by the plate 121, reservoir 112 and print head 113.

Figure 2A:
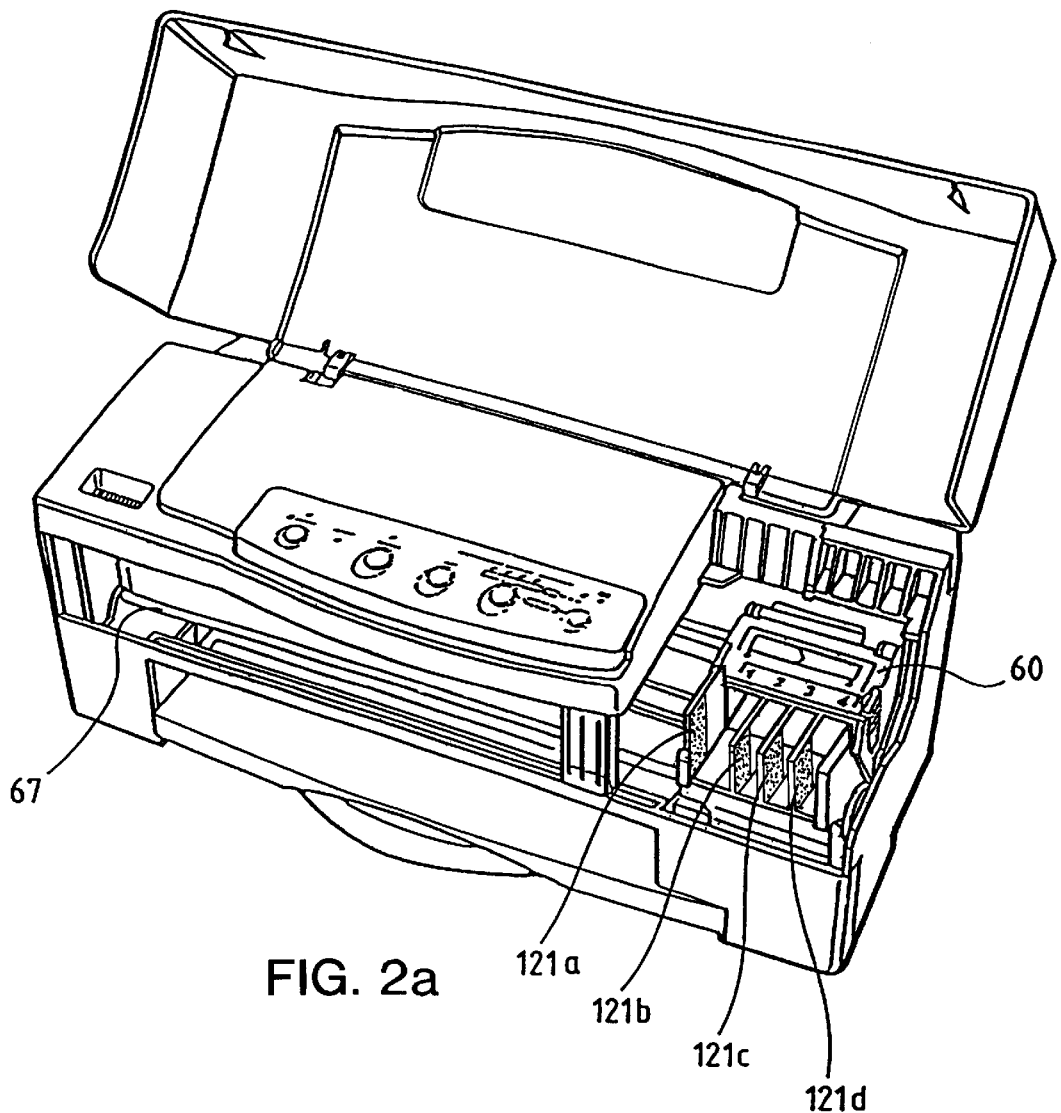
FIGS. 2a and 2b are simplified perspectives, respectively complete and partial, of the printing device.
Figure 2B:
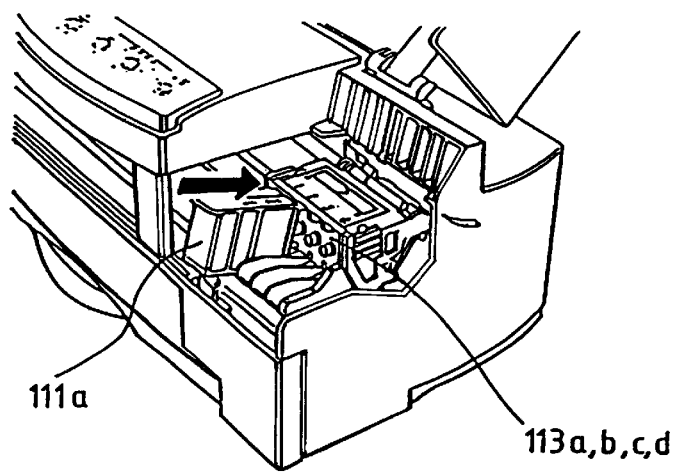

As is clear from FIGS. 2a and 2b, the printing device comprises conventionally a carriage 60 for carrying the print cartridges 111. The carriage is driven in a reciprocating movement on a movement path formed by guide rails 67. The motor drives the carriage 60 by means of a belt device which is not shown (conventional and known to persons skilled in the art).

The movement path of the print head 113 is parallel to a line on a print medium, not shown, such as a sheet of paper.

In the example embodiment, FIG. 2a shows a measuring device suitable for measuring four ink cartridges independent of each other. These ink cartridges are placed on the carriage and contain respectively inks of different colours. To each cartridge, for example, there corresponds a plate 121a, 121b, 121c or 121d. There is likewise a contact stud 113a, 113b, 113c or 113d designed to come into contact with each print head.

Figure 3:
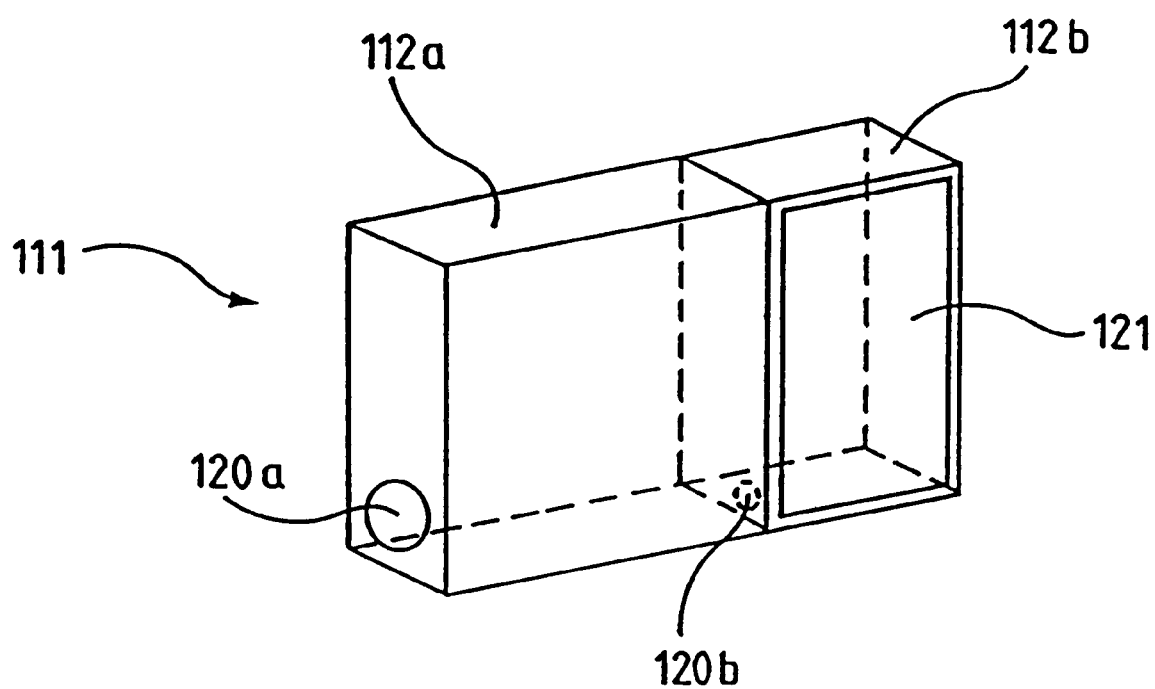
FIG. 3 is a simplified schematic view of the reservoir.

FIG. 3 depicts a simplified schematic view of an ink cartridge 111 (111a, 111b, 111c or 111d). Two storage cavities in series can be seen, 112a and 112b. The storage cavity 112a contains a porous body soaked with ink whilst the storage cavity 112b does not contain any porous body. A duct 120b connects these two cavities. In service, initially, the cavity 112b is emptied of its ink by means of the pipe 120b, the cavity 112a and the pipe 120a to the print head. In the example under consideration, the plate 121b is only opposite the cavity 112b.

Figure 4:
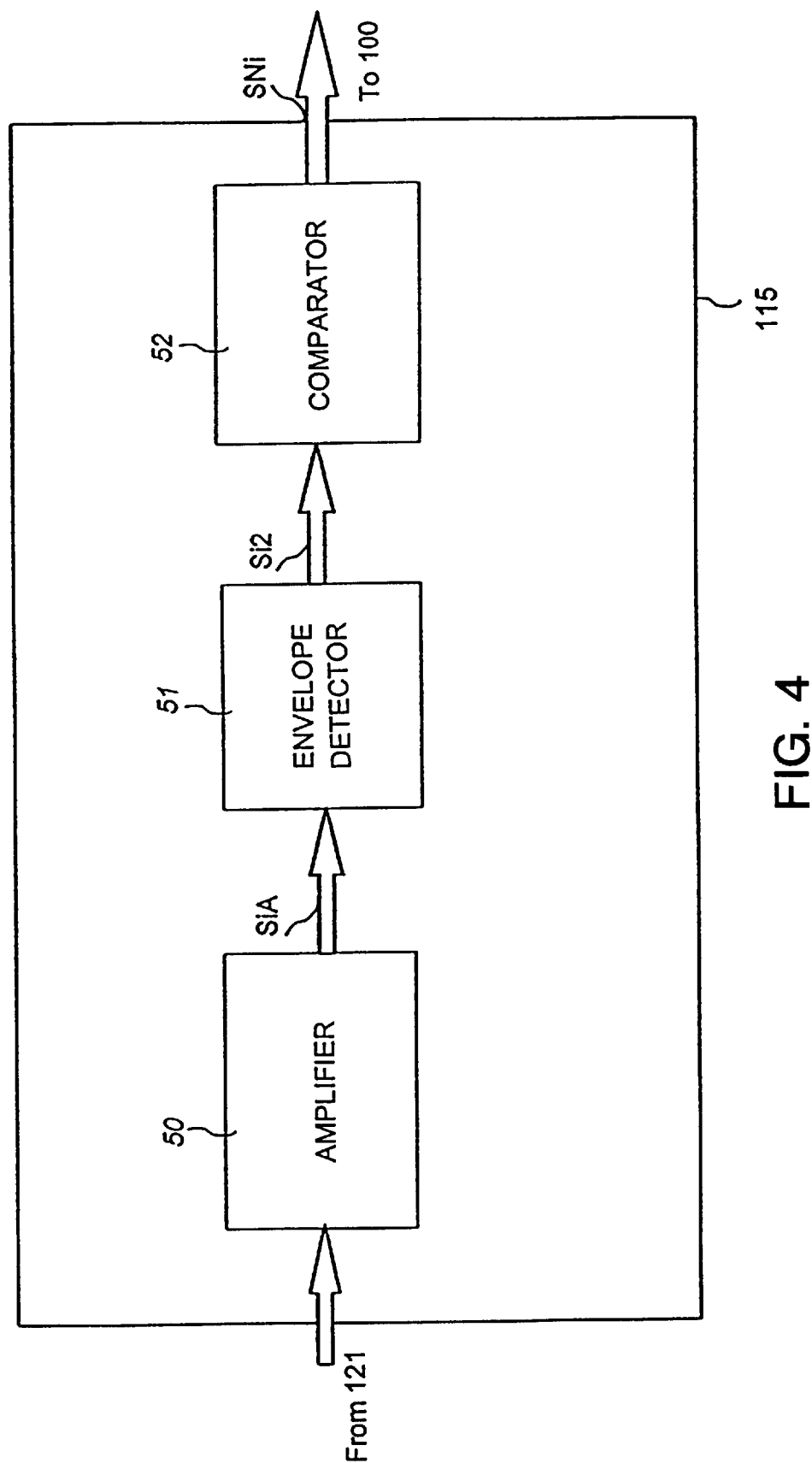
FIG. 4 is a block diagram of the device for processing the received signal.

FIG. 4 depicts the conversion circuit 115. The conversion circuit 115 comprises an amplifier 50 and an envelope detector 51. The envelope detector 51 is connected to a comparator 52 connected to the processing circuit 100.

The amplifier 50 supplies the amplifying signal SiA to the envelope detector 51, which determines the peak value of the amplified signal. This makes it possible to measure the amplitude of the signal, the frequency of course being deduced by the Central Unit, which knows the frequency of the oscillator 117 and the division ratio.

The signal Si2 output from the envelope detector 51 is supplied to the comparator, which compares Si2 with a predetermined threshold and supplies an item of binary information Sni 1 or 0, depending on whether the voltage Si2 is or is not above a predetermined threshold (in the present case 450 mV, for an output voltage from 119 of 4 volts peak to peak).

Figure 5:
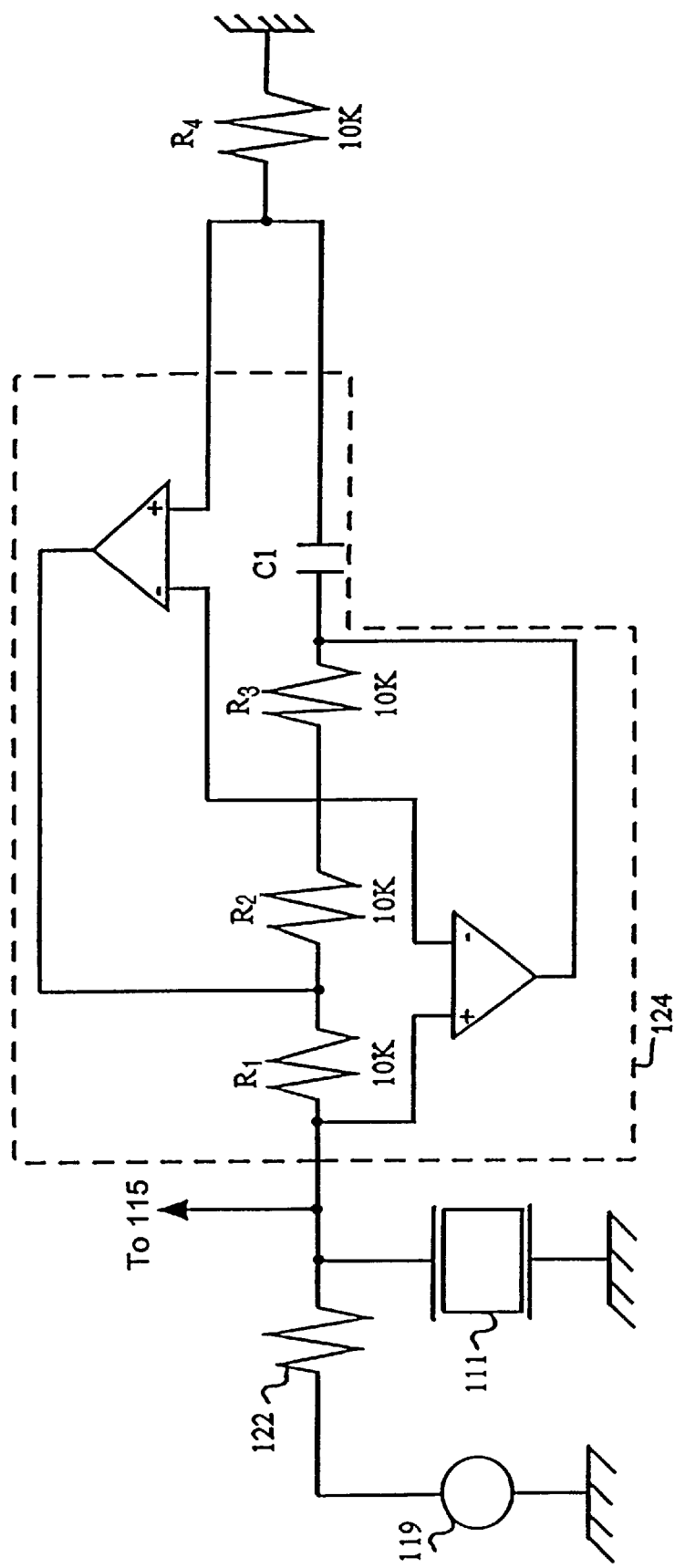
FIG. 5 is an electrical diagram of a gyrator circuit adapted to be used by the invention.

FIG. 5 depicts the electrical diagram of the gyrator circuit 124, with the ink cartridge, the resistor 122 and the amplifier 119 delivering the excitation signal.

This type of gyrator circuit was invented by Antoniou, and is known by the English term GIC (General Impedance Converter). It transforms an impedance Z into another value:

$$Ze = \frac{R_1 R_3 R_4}{R_2 Z}$$

If $R_1=R_2=R_3=R_4=10$ KΩ
then $Z_e=j(10$ KΩ$)^2 C\omega$
where C represents a capacitor.

Consequently the value of the capacitance C is multiplied by a factor of $10^8$ in order to become an inductance.

Thus a capacitance of 10 nF becomes an inductance of 1 H.

If it is associated with a capacitor of 4 pF, this gives a resonant frequency of approximately 70 kHz.

Thus it is possible to measure a capacitance of low value at medium or low frequencies. This is because the values of capacitances which the reservoir can take when the quantity of ink varies are below 5 pF.

In order to reduce the frequency still further, it suffices to increase the value of the capacitive element $C_1$.

When the oscillator 117 varies its frequency, the voltage 115 becomes maximum at the resonant frequency, and is thus determined by the Central Unit.

Figure 6:
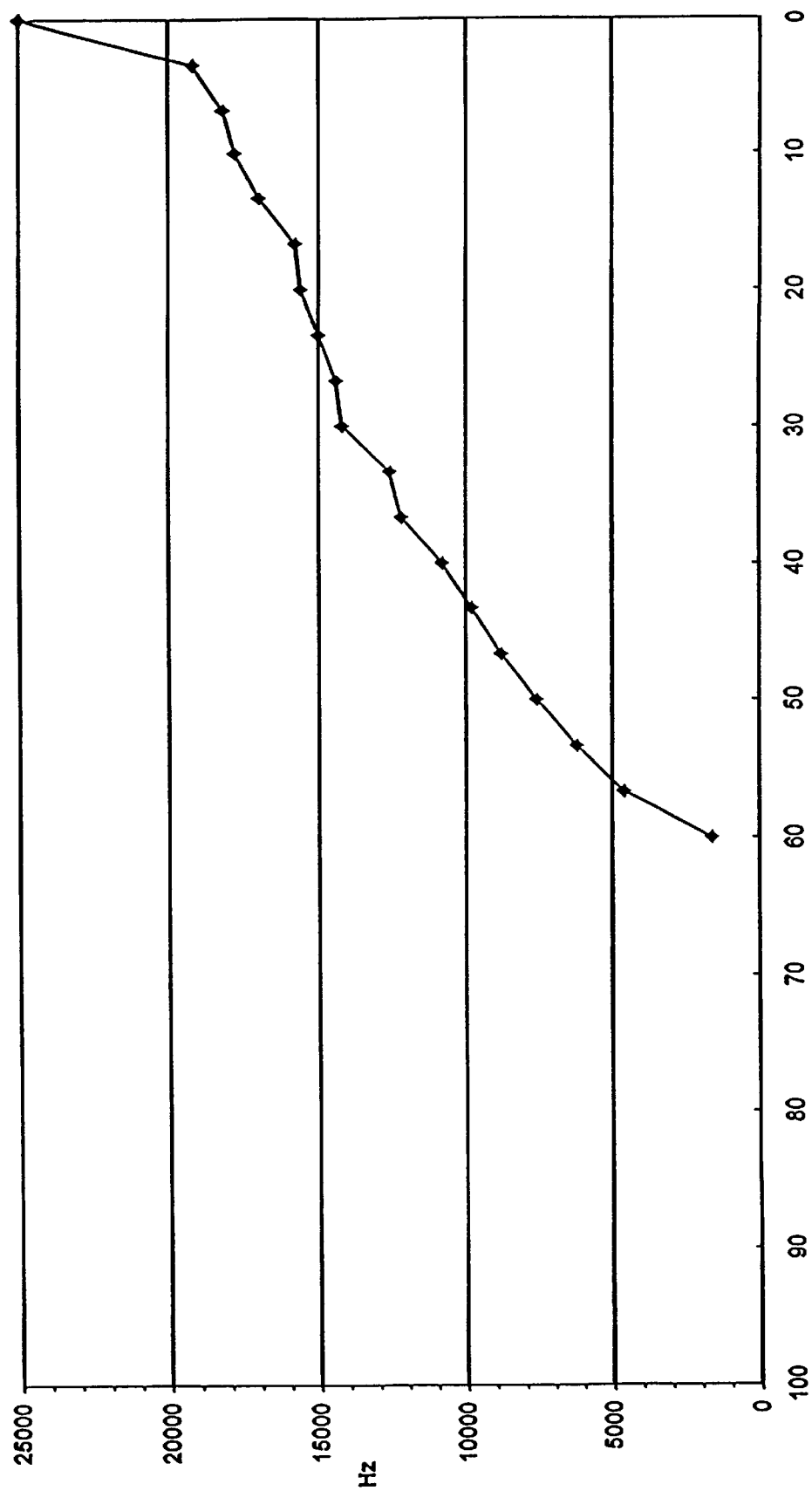
FIG. 6 is an example of an experimental curve which can be used according to one aspect of the invention.

FIG. 6 depicts an experiment curve which can be used by the invention. On the X-axis, the quantity of ink contained in the reservoir is expressed as a percentage of the maximum quantity. The width of the frequency band at which the comparator is at the high level is on the Y axis.

This resonant frequency band varies univocally as a function of the ink level in the reservoir. In the example under consideration, only a quantity of ink below 60% is detected and measured.

Figure 7:
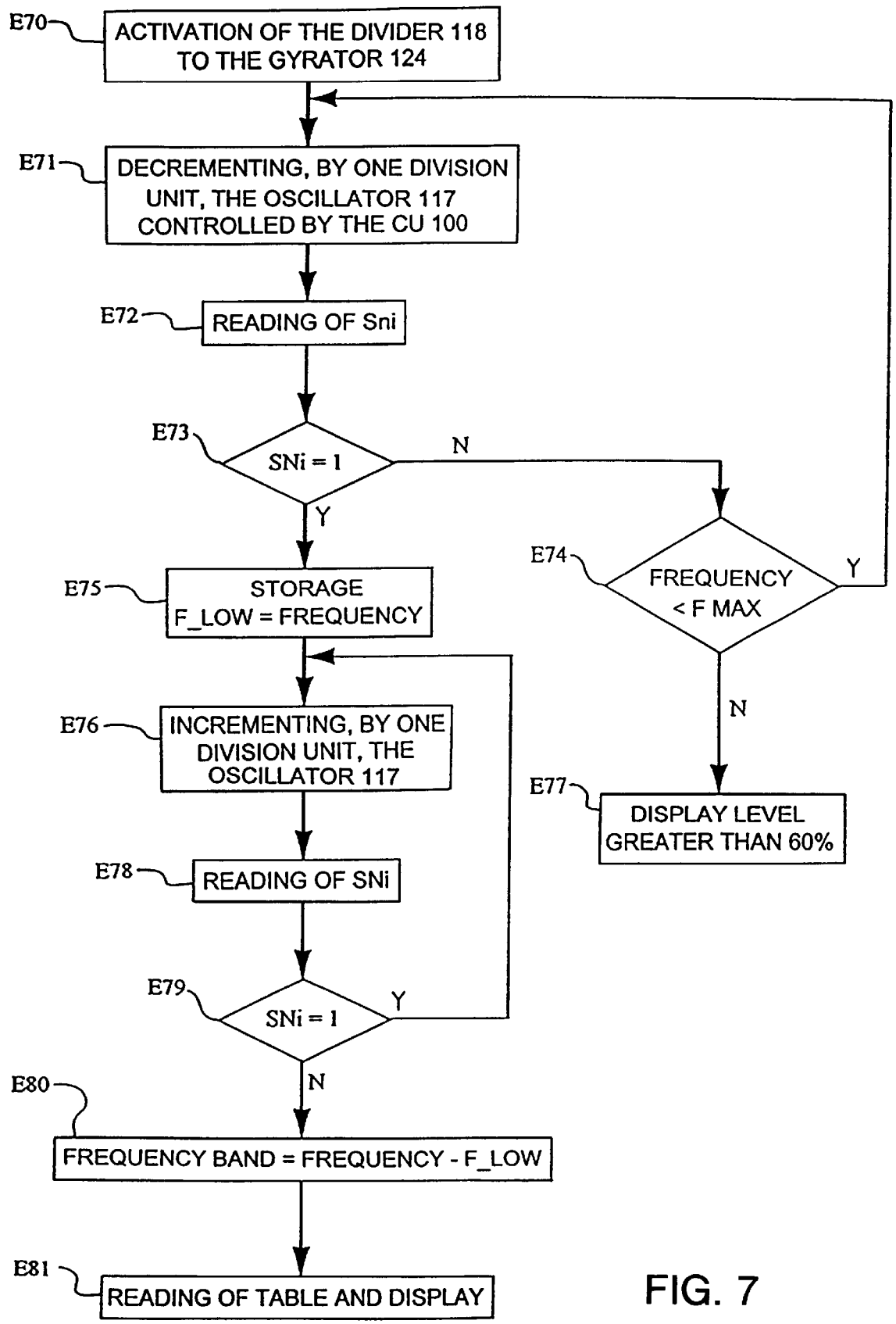
FIG. 7 is a flow diagram of the program resident in read only memory and implementing the invention.

As is clear from FIG. 7, an algorithm of the invention is stored in the read-only memory 103 of the printing device. The algorithm determines whether the quantity of ink is below 60% and in the affirmative evaluates the remaining quantity.

Step E70 consists of activating the frequency divider so as to obtain a frequency of 60 kHz. The frequency of the oscillator at 20 MHz is divided by 333.

At E71, the central unit decrements the frequency at the output of the divider by 1 kHz. This is a good compromise between the desired precision and the time required for scanning. This increment corresponds to dividing the oscillator by 328.

At E72, the central unit reads the signal Sni at the output of the comparator 52; at E73 it checks whether it is at the high level (logic 1 state in the example under consideration). The negative corresponds to cases where the voltage is below the predetermined threshold.

In the negative, the central unit passes to step E74, which consists of checking whether the analysis has been performed over the entire frequency band (here the maximum is 80 kHz). In the affirmative, the whole band has not been scanned, and the central unit therefore switches to step E71 and continues.

In the negative, and if at any moment the signal Sni has not been at the high level, this corresponds to a quantity of ink greater than 60% and the central unit displays this information at E77.

If E73 is positive, which relates to a low frequency of the frequency range, the equivalent frequency is stored under the variable F__ low at E75.

AT E76, the central unit decrements the frequency by 1 kHz at the output of the divider and then reads the state of Sni at E78. If Sni is at the high level, the central unit at E79 switches to E76 and continues to vary the frequency.

In the negative, the frequency band at which the signal Sni is at the high level is known, the central unit determines the frequency band by subtracting the variable F__ low from the present frequency and reads, in the table TC (corresponding to the curve in FIG. 6, for example) at step E81, the corresponding quantity of ink in order to display it.

It should be stated that, when the level of ink decreases, the capacitance decreases, the resonant frequency increases as well as the amplitude at the resonance, whence an increase in the width of the peak.

Figure 8:
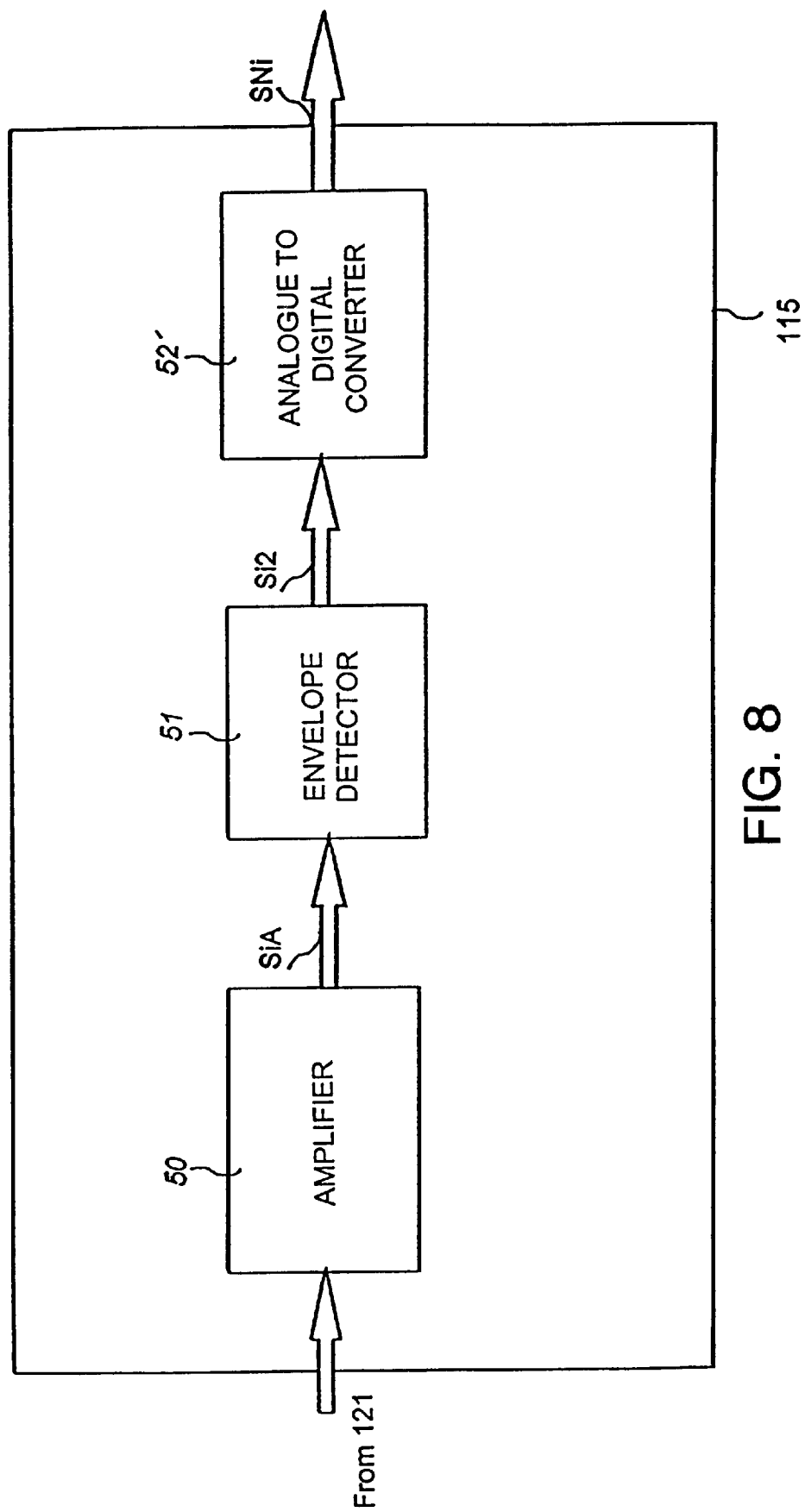
FIG. 8 is a block diagram of the device for processing the received signal according to another aspect of the invention.
Figure 9A:
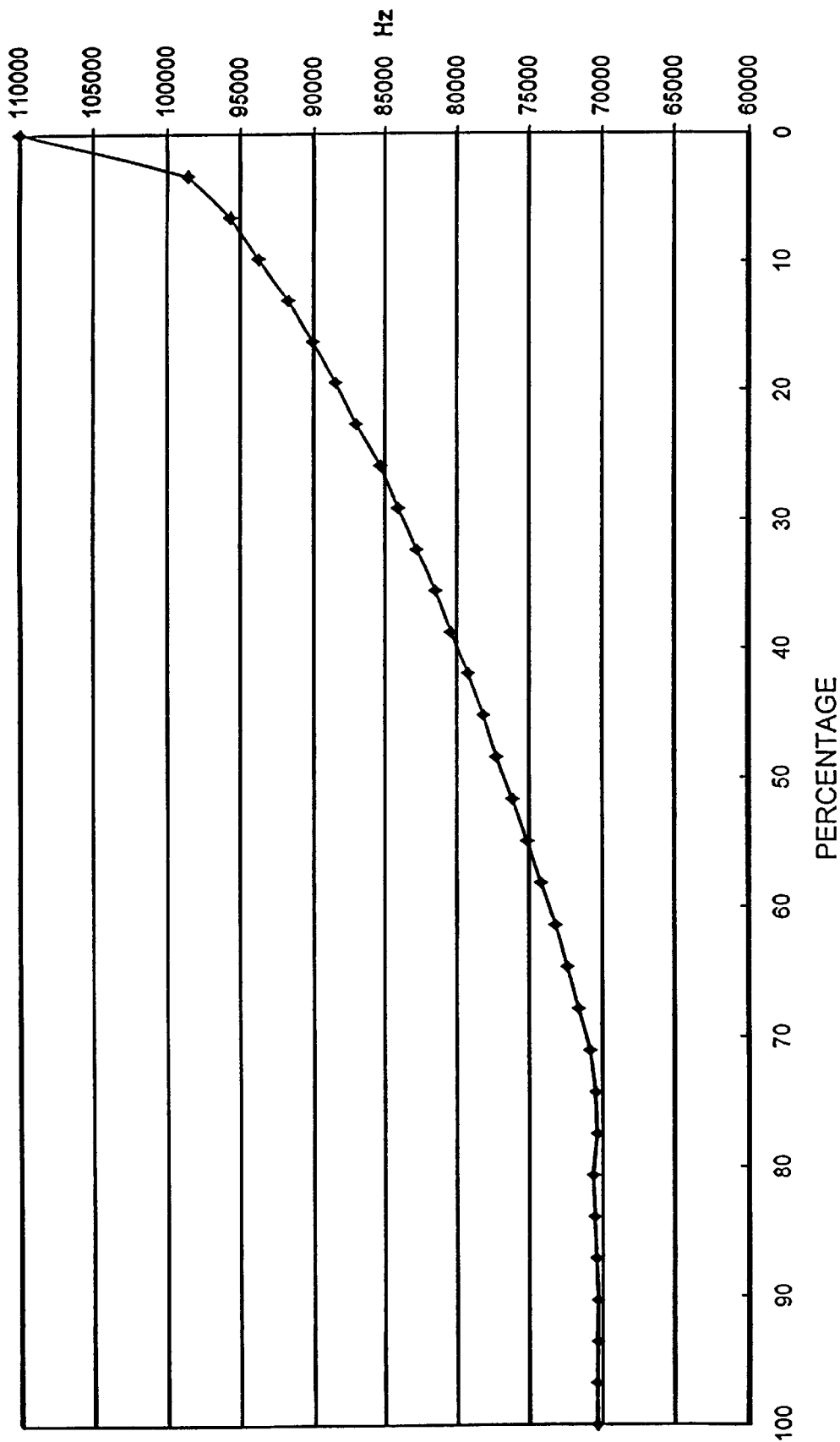
FIGS. 9a, 9b and 9c are examples of experimental curves which can be used by the invention.
Figure 9B:
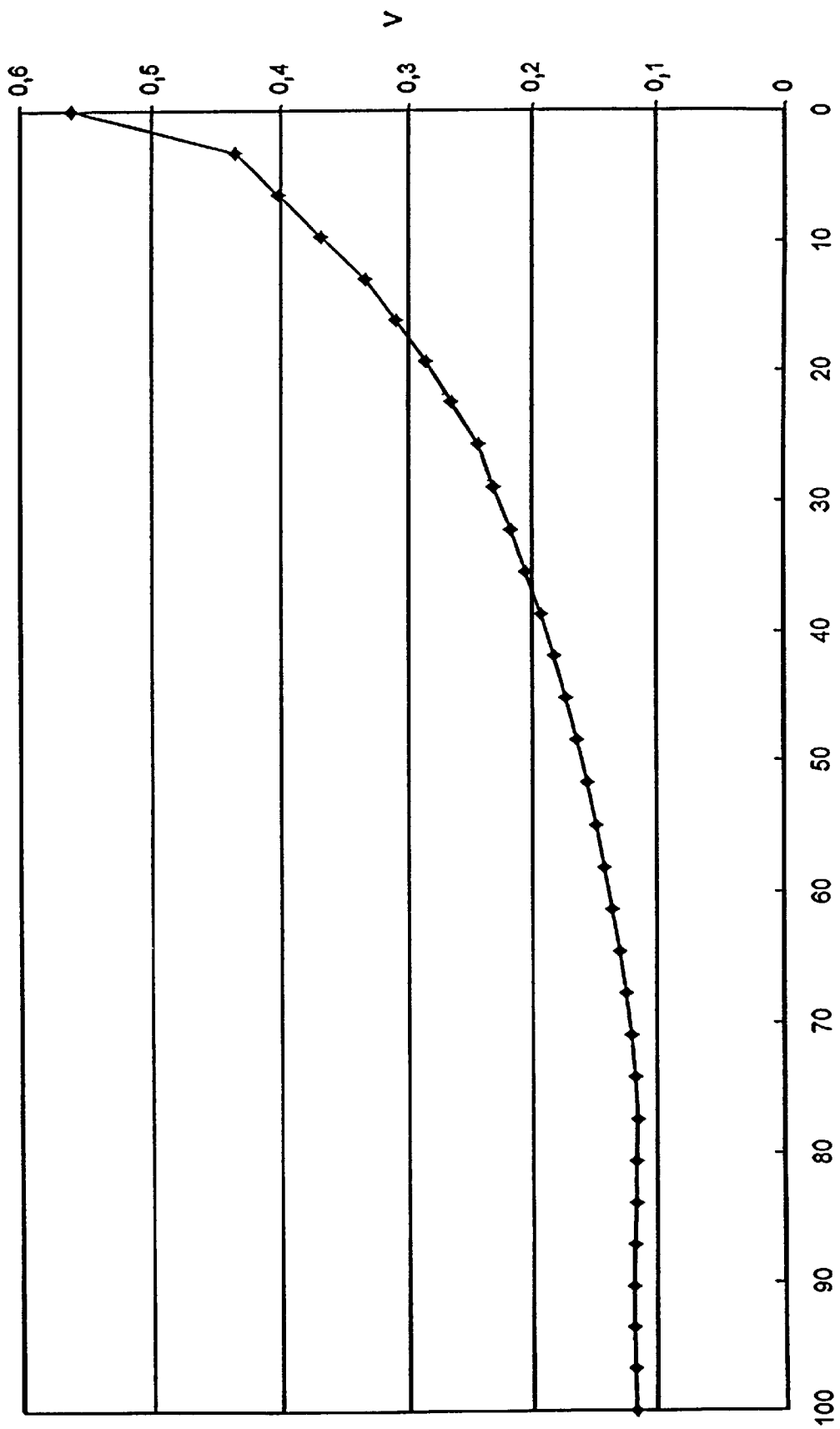
Figure 9C:
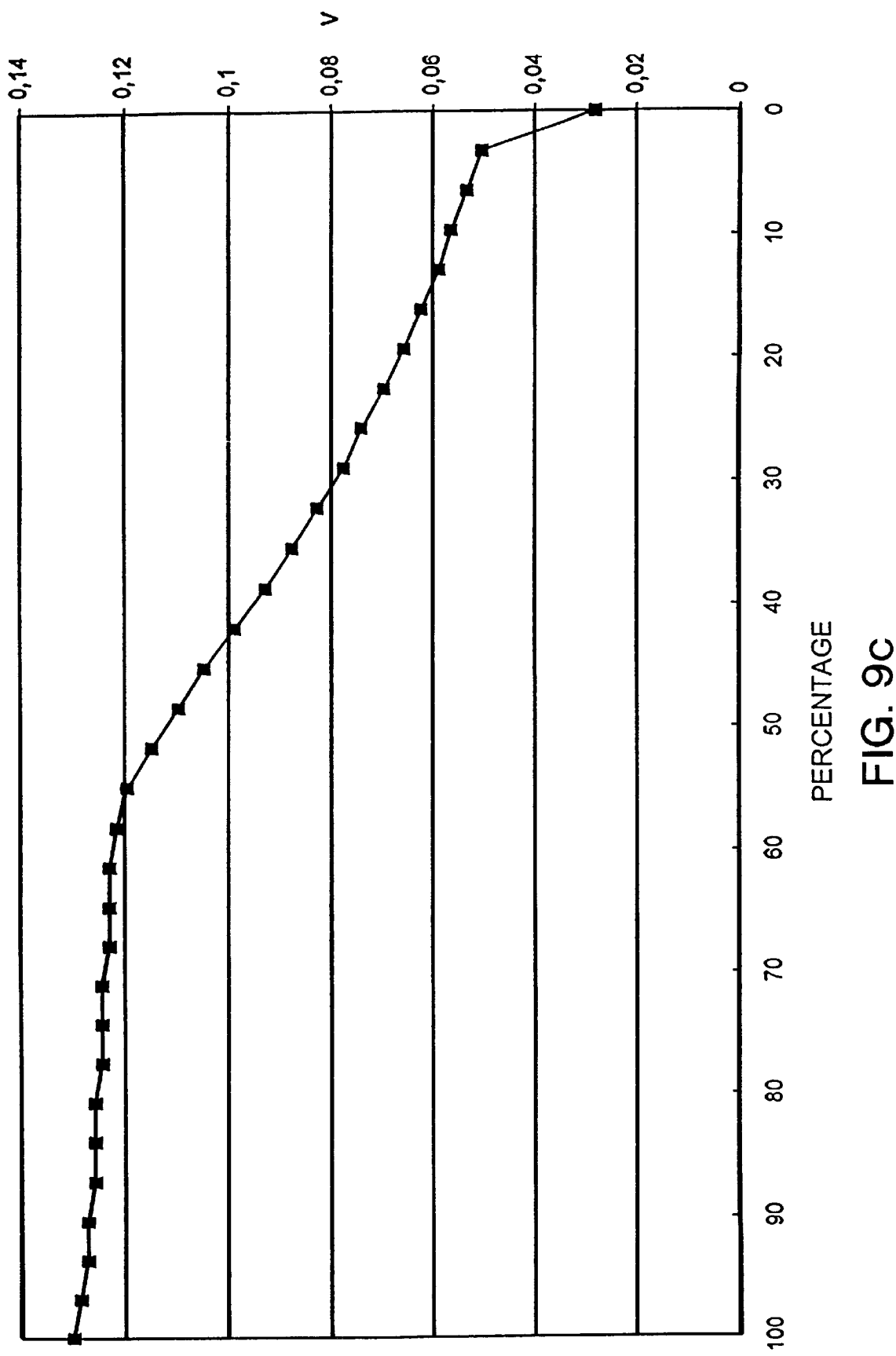
Figure 10:
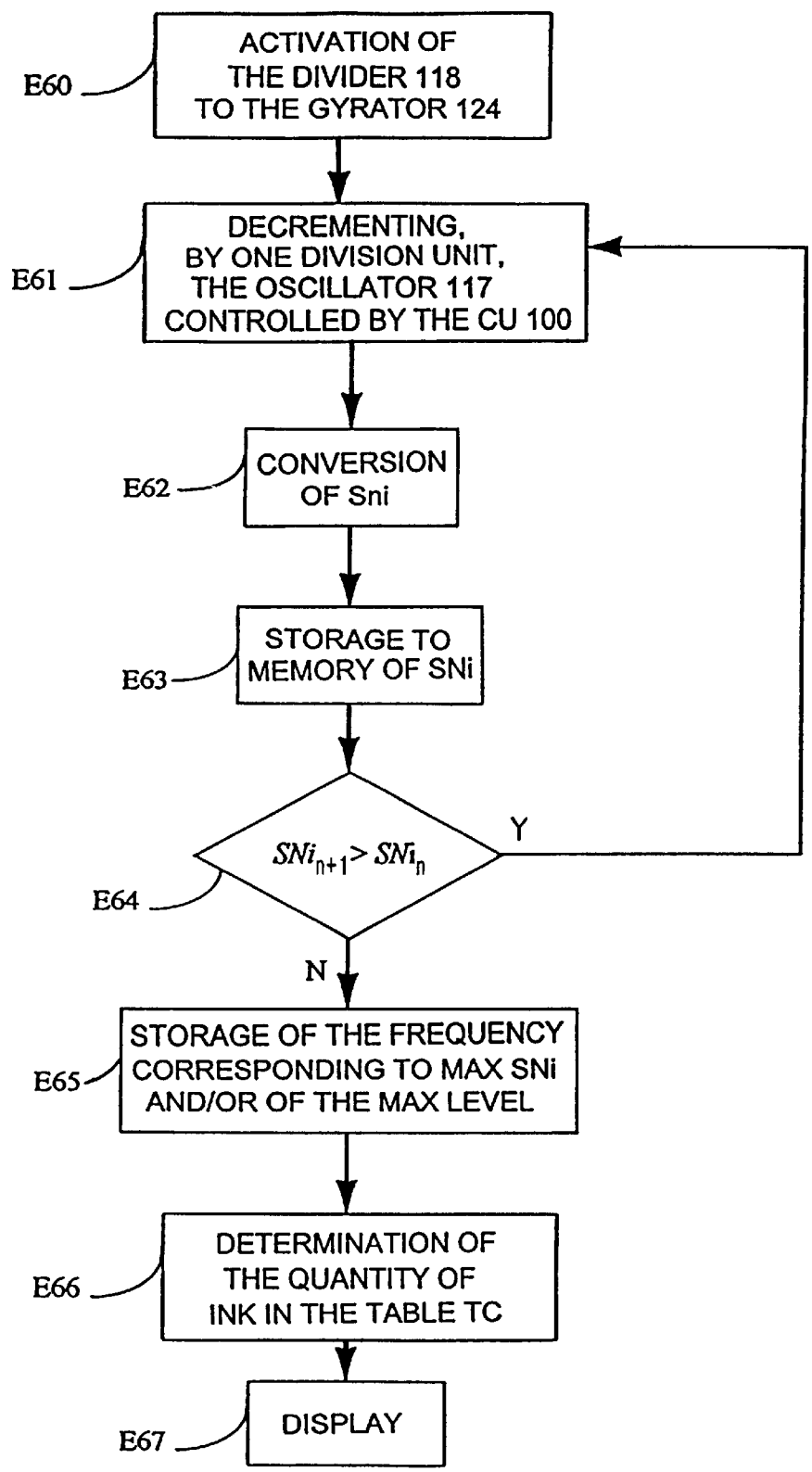
FIG. 10 is a flow diagram of the program resident in read only memory and implementing the invention.

FIGS. 8 to 10 correspond to another embodiment of the invention.

FIG. 8 differs from FIG. 4 in that the envelope detector of converting means 115' (to be substituted to means 115 of FIG. 1) is connected to an analogue to digital convertor 52' connected to the processing circuit 100.

FIG. 9a depicts an experimental curve which can be used by the invention. On the X-axis, the quantity of ink contained in the reservoir is expressed as a percentage of the maximum quantity. The resonant frequency expressed in Hz obtained by the resonant circuit is on the Y-axis.

This resonant frequency varies as a function of the level of ink in the reservoir.

FIG. 9b depicts another experimental curve which can be used by the invention. On the X-axis, the quantity of ink contained in the reservoir is expressed as a percentage of the maximum quantity. The amplitude of the voltage at the resonant frequency expressed in volts obtained by the resonant circuit is on the Y-axis. When the equivalent capacitance of the cartridge decreases, the amplitude increases.

FIG. 9c depicts yet another experimental curve which can be used by the invention. On the X-axis, the quantity of ink obtained in the reservoir is expressed as a percentage of the maximum quantity. The voltage at a fixed frequency expressed in volts obtained by the resonant circuit, here at the resonant frequency when the cartridge is full, is on the Y-axis. When the equivalent capacitance of the cartridge decreases, the resonant frequency increases, and therefore the measured voltage decreases.

The signal Si2 output from the envelope detector 51 is supplied to the converter 52. The converter 52 converts the analogue signal Si2 into a digital signal Sni in order to transmit it to the processing circuit 100. A look-up table TC (corresponding for example to one of the curves of FIGS. 9a to 9c or to approximations thereof) stored in memory 103 matches respectively a quantity of ink, for example expressed as a percentage of a maximum quantity, to the digital signal SM supplied by the converter 52. As an example, when the level is measured at either resonance or a fixed frequency, respectively, the signal is compared with a table TC2 or TC3 (the case of FIG. 9b or 9c). When the resonant frequency is measured, the signal is compared with a table TC1 (the case of FIG. 9a).

As is clear from FIG. 10, an algorithm of the invention is stored in the read only memory 103 of the printing device. The algorithm comprises eight steps E60 to E67, which are run through periodically, for example before the printing of a document. The algorithm determines the quantity of ink in the reservoir 112.

Step E60 consists of activating the programmable divider so as to obtain a frequency of 70 kHz.

At step E61, the frequency of the oscillator 117 is decremented so that the gyrator receives an excitation signal SE.

At step E62, the signal Si is converted into an item of digital information. This information Sni is stored in the RAM 109 at step E63. The Central Unit then checks at E64 whether or not the value Sni is greater than the previous one.

In the positive, the frequency of the oscillator 117 is incremented by returning to step E61. In the negative, the Central Unit goes to step E65 in order to store the value of the frequency corresponding to maximum Sni.

The Central Unit will then, at step E66, determine the quantity of ink corresponding to the information of the frequency by means of the look-up table TC1 or the table TC2 or the table TC3.

Finally, step E67 consists of displaying the result.

In a variant, the value of the ink level is transmitted to a remote device such as a microcomputer by means of the Centronics interface.

The algorithms of FIGS. 7 or 10 may be partially or totally stored in any information storage means able to cooperate with the Central Unit. This means may be read by a computer or processor; it is included or not in the device and may be removable. As an example, it may comprise a magnetic tape, a floppy disc or a CD-ROM (Compact Disk with Read Only Memory).

What is claimed is:

1. Method of determining the quantity of an electrically conductive product contained in a reservoir made of electrically insulating material having at least one storage cavity, according to which:

a resonant circuit is formed having a capacitive arrangement comprising at least part of this reservoir;

this resonant circuit is connected to an excitation signal generator;

a measurement procedure is defined according to which a plurality of excitation signals is applied to this resonant circuit having different frequencies included in a predetermined frequency range and a plurality of measurement signals are taken off at a measuring point in response to these excitation signals, this frequency range being chosen so as to contain the frequencies at which the resonant circuit is in resonance for a plurality of values of the quantity of product within a predetermined operating range;

a processing procedure is defined consisting of identifying the instantaneous resonant frequency of the resonant circuit from this plurality of measurement signals, measuring the width, for a given amplitude level, of the resonance peak and deriving therefrom an item of information representing the quantity of product contained in the storage cavity, this amplitude level being chosen so that there exists a univocal correlation law between the width of the resonance peak and this item of information when the quantity of product is within the said operating range;

at least one determination cycle is effected, consisting of triggering the measurement procedure and the processing procedure, and capturing the instantaneous value of the said item of information.

2. Method according to claim 1, wherein the resonant circuit is designed so as to have a resonant frequency which varies with the quantity of product contained in the storage chamber, within the said operating range, in a range from approximately 1 kHz to approximately 100 kHz.

3. Method according to claim 1 wherein the resonant circuit includes a notional inductor.

4. Method according to claim 3, wherein the notional inductor is a circuit of the "gyrator" type, known per se.

5. Method according to claim 3, wherein the said capacitive arrangement and the notional inductor are distinct from each other.

6. Method according to claim 1, wherein the resonant circuit is of the parallel type.

7. Method according to claim 6, wherein the said resonant circuit includes a capacitive arm and an inductive arm connected between a measuring point and earth.

8. Method according to claim 1, wherein the reservoir has a first storage cavity containing a porous body and a second storage cavity communicating with the delivery duct through the first cavity and the capacitive arrangement includes two metal parts, one of which is disposed in the immediate vicinity and opposite at least part of this second cavity.

9. Method according to claim 1, wherein the reservoir comprises a chamber delimiting the said cavity, a product discharge duct connected to an outlet of the reservoir and a print head and wherein the capacitive arrangement includes two metal parts, one of which is disposed in the immediate vicinity of a portion of this chamber, and the other one of which is formed by this print head.

10. Method according to claim 9, wherein an operating range of possible values which can be taken by the measurement signal when the quantity of product varies within a given range is identified, and an abnormality procedure is triggered when the instantaneous value of this measurement signal is outside this operating range.

11. Method according to claim 1, wherein said amplitude level is chosen so that the operating range contains at least values of the quantity of product representing from 0% to 60% of the maximum quantity of product.

12. Method according to claim 11, wherein said amplitude level is equal to approximately 50% of the height of the resonance peak when the quantity of product is at a minimum.

13. Method according to claim 1, wherein the excitation signals are alternating signals.

14. Method according to claim 1, wherein the reservoir contains an electrically conductive ink and is adapted to be used in a printing machine having a casing, and wherein the resonant circuit, including at least one metal part to be opposite to and in the immediate vicinity of part of the reservoir, is disposed so as to be fixed with respect to the said casing.

15. Device for determining the quantity of an electrically conductive product contained in a reservoir made of electrically insulating material, having:
- a resonant circuit including a capacitive arrangement designed to comprise at least part of this reservoir, this circuit having, for various possible values of the quantity of product contained in a given operating range, resonant frequencies contained within a predetermined frequency range;
- an excitation signal generator connected to the resonant circuit and adapted to generate various frequencies belonging to this predetermined range;
- measurement and processing means connected to this resonant circuit and to the excitation signal generator and designed so as to apply to the resonant circuit a plurality of excitation signals having various frequencies within the said predetermined range, to detect a measurement signal in response to each excitation signal, and to measure the width, for a given amplitude level, of the resonance peak and to derive therefrom an item of information representing the quantity of product contained in the storage cavity, this amplitude being chosen so that there exists a univocal correlation law between the width of the resonance peak and this information when the quantity of product is within the said operating range; and
- means for capturing the instantaneous value of the said information.

16. Device according to claim 15, wherein the resonant circuit is designed so as to have a resonant frequency which varies with the quantity of product contained in the storage chamber, within the said operating range, in a range from approximately 1 kHz to approximately 100 kHz.

17. Device according to claim 15, wherein the resonant circuit includes a notional inductor.

18. Device according to claim 17, wherein the notional inductor is a circuit of the "gyrator" type, known per se.

19. Device according to claim 17, wherein said capacitive arrangement and the notional inductor are distinct from each other.

20. Device according to claim 15, wherein the resonant circuit is of the parallel type.

21. Device according to claim 20, wherein said resonant circuit includes a capacitive arm and an inductive arm connected between a measuring point and earth.

22. Device according to claim 15, wherein the reservoir has a first storage cavity containing a porous body and a second storage cavity communicating with the discharge duct through the first cavity, and the capacitive arrangement includes two metal parts, one of which is disposed in the immediate vicinity of and opposite this second cavity.

23. Device according to claim 15, wherein the reservoir comprises a chamber delimiting said cavity, a product delivery duct connected to an outlet of the reservoir and a print head, and wherein the capacitive arrangement includes two metal parts, one of which is disposed in the immediate vicinity of a portion of this chamber and the other one of which is formed by this print head.

24. Device according to claim 23, comprising means for storing data identifying an operating range of possible values which can be taken by the measurement signal when the quantity of product varies within a given range, and means designed so as to trigger an abnormality procedure when the instantaneous value of this measurement signal is outside this operating range.

25. Device according to claim 15, wherein said amplitude level is chosen so that the operating range contains at least values of the quantity of product representing from 0% to 60% of the maximum quantity of product.

26. Device according to claim 25, wherein said amplitude level is at least equal to approximately 50% of the height of the resonance peak when the quantity of product is at a minimum.

27. Device according to claim 15, wherein the excitation signal generator is an alternating signal generator.

28. Device according to claim 15, wherein the reservoir contains an electrically conductive ink and is designed to be used in a printing machine having a casing, and wherein the resonant circuit, including at least one metal part designed to be opposite to and in the immediate vicinity of a part of the reservoir is mounted fixedly on the said casing.

29. Signal processing device adapted to cooperate with:
- a reservoir containing an electrically conductive product and produced from an electrically insulating material;
- a resonant circuit including a capacitive arrangement designed to comprise at least part of this reservoir, this circuit having, for various possible values of the quantity of product contained in a given operating range, resonant frequencies contained within a predetermined frequency range;
- an excitation signal generator connected to the resonant circuit and adapted to generate various frequencies belonging to this predetermined range;
- this signal processing device comprising
  - measurement and processing means connected to this resonant circuit and to the excitation signal generator and designed so as to apply to the resonant circuit a plurality of excitation signals having various frequencies within the said predetermined range, to detect a measurement signal in response to each excitation signal, and to measure the width, for a given amplitude level, of the resonance peak and to derive therefrom an item of information representing the quantity of product contained in the storage cavity, this amplitude level being chosen so that there exists a univocal correlation law between the width of the resonance peak and this item of information when the quantity of product is within the said operating range; and means for capturing the instantaneous value of the said item of information.

30. Device for supplying electrically conductive product comprising a reservoir containing this product and produced from electrically insulating material; and a device for determining the quantity of product contained in the reservoir according to claim 15.

31. Image formation device having a reservoir containing an electrically conductive marking product and produced from electrically insulating material; and a device for determining the quantity of product contained in the reservoir according to claim 15.

32. Printing system having an electrically conductive ink reservoir, a print head connected to this reservoir, control means connected to this print head and a device according to claim 15.

33. Office machine designed to receive an ink reservoir, having a device for determining the quantity of product contained in this ink reservoir according to claim 15.

34. Office signal processing unit designed to cooperate with an ink reservoir, an excitation signal generator, and a resonant circuit connected to this generator including a capacitive arrangement containing at least part of this reservoir, this office unit having a processing device according to claim 29.

35. Method of determining the quantity of an electrically conductive product contained in a reservoir made of electrically insulating material, this reservoir having a storage chamber and a product delivery duct and being provided with an electrically conductive ejection head connected to this duct, wherein:

a resonant circuit is formed, having an arm including a capacitor comprising at least part of this reservoir and an arm including a notional inductor, these arms being connected in parallel between a measuring point and a reference potential, this capacitor having two conductive elements forming electrodes, one of which is in the immediate vicinity of a zone of the storage chamber and the other one of which is formed by the said ejection head;

this resonant circuit is connected to an excitation signal generator;

a measurement procedure is defined, according to which at least one excitation signal is applied to this resonant circuit and a measuring signal is taken off the point of measurement in response to each excitation signal;

a processing procedure is defined, consisting of identifying a characteristic of the resonant circuit from this measurement signal or signals and deriving therefrom an item of information representing the quantity of product contained in the storage cavity, this characteristic being chosen so that there is a univocal correlation law between this characteristic and this information;

at least one determination cycle is effected, consisting of triggering the measurement procedure and the processing procedure, and capturing the instantaneous value of the said item of information.

36. Method according to claim 35, wherein the arm including the notional inductor is designed so that the resonant circuit has a resonant frequency which varies with the quantity of product contained in the storage chamber within a range from around 1 kHz to around 100 kHz.

37. Method according to claim 35, wherein the measurement method includes a preliminary step consisting of a identifying a range within which the resonant frequency of the resonant circuit varies when the quantity of product contained in the storage chamber varies, and a step consisting of applying, to the resonant circuit, a succession of excitation signals having different frequencies chosen in this range and taking a measurement signal for each of these frequencies.

38. Method according to claim 37, wherein, according to the processing procedure, the instantaneous resonant frequency of the resonant circuit is identified as a characteristic.

39. Method according to claim 37, wherein, according to the processing procedure, the instantaneous resonant frequency of the resonant circuit is identified and the amplitude of the measurement signal corresponding to this instantaneous resonant frequency is identified as a characteristic.

40. Method according to claim 35, wherein, according to the processing procedure, an excitation signal of predetermined frequency is applied to the resonant circuit and the amplitude of the measurement signal in response to this excitation signal is identified as a characteristic.

41. Method according to claim 40, wherein this predetermined frequency is chosen so as to be substantially equal to the resonant frequency of the resonant circuit when the storage chamber contains an extreme quantity of product.

42. Method according to claim 41, wherein the predetermined frequency is the resonant frequency of the resonant circuit when the storage chamber contains a maximum quantity of product.

43. Method according to claim 35, wherein the arm including the notional inductor is a circuit of the "gyrator" type, known per se.

44. Method according to claim 35, wherein said reference potential is chosen so as to be equal to that of earth.

45. Method according to claim 35, wherein the reservoir includes a first storage cavity containing a porous body and a second storage cavity communicating with the delivery duct through the first cavity, the electrode disposed in the immediate vicinity of the storage chamber being opposite at least part of this second cavity.

46. Method according to claim 35, wherein the excitation signal is an alternating signal.

47. Method according to claim 35, wherein an operating range of possible values is identified which can be adopted by the said characteristic when the quantity of product varies within a given range, and an abnormality procedure is triggered when the instantaneous value of the characteristic is outside this operating range.

48. Method according to claim 35, wherein the reservoir contains an electrically conductive ink and is designed to be used in a printing machine having a casing, and wherein the resonant circuit, including the electrode situated in the immediate vicinity of the storage chamber, is formed so as to be fixed with respect to the said casing.

49. Device for determining the quantity of an electrically conductive product contained in a reservoir made of electrically insulating material, this reservoir having a storage chamber and a product delivery duct and being provided with an electrically conductive ejection head connected to this duct, having:

a resonant circuit having a first arm designed to include at least part of the reservoir and a second arm including a notional inductor, these arms being connected in parallel between a measurement point and a reference potential, this first arm having an electrical conductor designed to be in the immediate vicinity of a zone of the storage chamber and a means for connecting the said ejection head to the reference potential, this first electrical conductor and this ejection, head defining a dielectric space containing at least part of the storage chamber and the delivery duct and thus forming a capacitor;

an excitation signal generator connected to the resonant circuit;

measurement and processing means connected to the said measurement point and to the excitation signal generator and designed so as to apply at least one excitation signal to the resonant circuit, to detect a measurement signal in response to each excitation signal, to identify a characteristic of the resonant circuit from this measurement signal or signals and to derive therefrom an item of information representing the quantity of product contained in the storage cavity, this characteristic being chosen so that there is a univocal correlation law between this characteristic and this item of information;

means for capturing the instantaneous value of the said item of information.

50. Device according to claim 49, wherein the arm including the notional inductor is designed so that the resonant circuit has a resonant frequency which varies with the quantity of product contained in the storage chamber within a range of around 1 kHz to around 100 kHz.

51. Device according to claim 49, wherein the measurement and processing means are designed so as to apply to the resonant circuit a succession of excitation signals having different frequencies chosen within a range and taking a measurement signal for each of these frequencies, this range of frequencies being chosen so as to contain the resonant frequencies of the resonant circuit for a plurality of possible values of the quantity of product contained in the reservoir.

52. Device according to claim 51, wherein the measurement and processing means are designed so as to identify as a characteristic the instantaneous resonant frequency of the resonant circuit.

53. Device according to claim 51, wherein the measurement and processing means are designed so as to identify the instantaneous resonant frequency of the resonant circuit and to identify as a characteristic the amplitude of the measurement signal corresponding to this instantaneous resonant frequency.

54. Device according to claim 49, wherein the measurement and processing means are designed so as to apply to the resonant circuit an excitation signal of predetermined frequency and to identify as a characteristic the amplitude of the measurement signal in response to this excitation signal.

55. Device according to claim 54, wherein this predetermined frequency is substantially equal to the resonant frequency of the resonant circuit when the storage chamber contains an extreme quantity of product.

56. Device according to claim 55, wherein the predetermined frequency is the resonant frequency of the resonant circuit when the storage chamber contains a maximum quantity of product.

57. Device according to claim 49, wherein the branch including the notional inductor is a circuit of the "gyrator" type, known per se.

58. Device according to claim 49, wherein said reference potential is that of earth.

59. Device according to claim 49, wherein the reservoir has a first storage cavity containing a porous body and a second storage cavity communicating with the delivery duct through the first cavity, the said first conductor disposed in the immediate vicinity of the storage chamber being disposed opposite this second cavity.

60. Device according to claim 49, wherein the excitation signal is an alternating signal.

61. Device according to claim 49, wherein the measurement and processing means are also designed so as to detect a case where the characteristic has a value which does not correspond to a possible value of the quantity of product contained in the reservoir and to then trigger an abnormality procedure.

62. Signal processing device adapted to cooperate with:

a reservoir containing an electrically conductive product and produced from an electrically insulating material, this reservoir having a storage chamber and a product delivery duct and being provided with an electrically conductive ejection head connected to this duct;

a resonant circuit having a first arm designed to include at least part of the reservoir and a second arm including a notional inductor, these arms being connected in parallel between a measurement point and a reference potential, this first arm having an electrical conductor disposed in the immediate vicinity of a zone of the storage chamber and a means for connecting the said ejection head to the reference potential, this first electrical conductor and this ejection head defining a dielectric space containing at least part of the storage chamber and the delivery duct and thus forming a capacitor;

an excitation signal generator connected to the resonant circuit;

this processing device comprising:

measurement and processing means designed to be connected to the said measurement point and to the excitation signal generator and designed so as to apply at least one excitation signal to the resonant circuit, to detect a measurement signal in response to each excitation signal, to identify a characteristic of the resonant circuit from this measurement signal or signals and to derive therefrom an item of information representing the quantity of product contained in the storage cavity, this characteristic being chosen so that there is a univocal correlation law between this characteristic and this item of information; and means for capturing the instantaneous value of the said item of information.

63. Device for supplying an electrically conductive product, having a reservoir containing this product and produced from an electrically insulating material, this reservoir having a storage chamber and a product delivery duct and being provided with an electrically conductive ejection head connected to this duct;

control means connected to this ejection head; and a device for determining the quantity of product contained in the reservoir in accordance with claim 49.

64. Image formation device having a reservoir containing an electrically conductive marking product and produced from an electrically insulating material, this reservoir having a storage chamber and a product delivery duct and being provided with an electrically conductive ejection head connected to this duct;

control means connected to this ejection head; and a device for determining the quantity of product contained in the reservoir in accordance with claim 49.

65. Printing system having an electrically conductive ink reservoir and a device according to claim 49.

66. Office machine designed to receive an ink reservoir, having a device for determining the quantity of product contained in this ink reservoir according to claim 49.

67. Office signal processing unit designed to cooperate with an ink reservoir, an excitation signal generator and a resonant circuit connected to this generator and having a first arm including at least part of the reservoir and a second arm including a notional inductor, these arms being connected in parallel between a measuring point and a reference potential, this first arm including an electrical conductor disposed in the immediate vicinity of a zone of the storage chamber and a means for connecting the said ejection head to the reference potential, this first electrical conductor and this ejection head defining a dielectric space containing at least part of the storage chamber and the discharge duct and thus determining a capacitor, this office unit including a processing device according to claim 62.

68. Storage medium storing a program for determining the quantity of an electrically conductive product contained in a reservoir made of an electrically insulating material, said program enabling the steps of the method of claim 1 to be implemented.

69. Storage medium according to claim 68 wherein said medium is detachably mountable in a device for determining the quantity of an electrically conductive product contained in a reservoir made of an electrically insulating material.

70. Storage medium according to claim 68 wherein said medium is a floppy disk or a CD-ROM.

71. Storage medium storing a program for determining the quantity of an electrically conductive product contained in a reservoir made of an electrically insulating material, said program enabling the steps of the method of claim 35 to be implemented.

72. Storage medium according to claim 71 wherein said medium is detachably mountable in a device for determining determining the quantity of an electrically conductive product contained in a reservoir made of an electrically insulating material.

73. Storage medium according to claim 71 wherein said medium is a floppy disk or a CD-ROM.

* * * * *

UNITED STATES PATENT AND TRADEMARK OFFICE
CERTIFICATE OF CORRECTION

PATENT NO.    : 6,351,716 B1
DATED         : February 26, 2002
INVENTOR(S)   : Marie-Hélène Froger et al.

It is certified that error appears in the above-identified patent and that said Letters Patent is hereby corrected as shown below:

Column 9,
Line 13, "element 112," should read -- element 122, --.

Column 12, line 21 - Column 20, line 25,
Claims 1-73 should be deleted and substituted with the following claims 1-73:

--1.    A method of determining the quantity of an electrically conductive product contained in a reservoir made of electrically insulating material having at least one storage cavity, comprising:

forming a resonant circuit having a capacitive arrangement comprising at least part of the reservoir, said resonant circuit being connected to an excitation signal generator;

defining a measurement procedure according to which a plurality of excitation signals is applied to said resonant circuit, each of said plurality of excitation signals having respectively different frequencies included in a predetermined frequency range, and according to which a plurality of measurement signals are measured at a measuring point in response to said excitation signals, said frequency range being chosen so as to contain frequencies at which the resonant circuit is in resonance for a plurality of values of the quantity of product within a predetermined operating range;

defining a processing procedure which includes identifying the instantaneous resonant frequency of the resonant circuit from said plurality of measurement signals, measuring the width, for a given amplitude level, of the resonance peak and deriving therefrom an item of information representing the quantity of product contained in the storage cavity, the amplitude level being chosen so that there exists an unequivocal correlation law between width of the resonance peak and the item of information when the quantity of product is within the predetermined operating range; and effecting at least one determination cycle which includes triggering the measurement procedure and the processing procedure, and capturing the instantaneous value of the item of information.

2.    A method according to Claim 1, wherein the resonant circuit is constructed to have a resonant frequency which varies with the quantity of product contained in the storage chamber, within the operating range, in a range from approximately 1 kHz to approximately 100 kHz.

3.    A method according to Claim 1 wherein the resonant circuit includes a notional inductor.

4.    A method according to Claim 3, wherein the notional inductor is a circuit of the "gyrator" type.

5.    A method according to Claim 3, wherein the capacitive arrangement and the notional inductor are distinct from each other.

6.    A method according to Claim 1, wherein the resonant circuit is of the parallel type.

UNITED STATES PATENT AND TRADEMARK OFFICE
CERTIFICATE OF CORRECTION

PATENT NO. : 6,351,716 B1
DATED : February 26, 2002
INVENTOR(S) : Marie-Hélène Froger et al.

It is certified that error appears in the above-identified patent and that said Letters Patent is hereby corrected as shown below:

Column 12, line 21 - Column 20, line 25 (cont'd),

7. A method according to Claim 6, wherein the resonant circuit includes a capacitive arm and an inductive arm connected between a measuring point and ground.

8. A method according to Claim 1, wherein the reservoir has a first storage cavity containing a porous body and a second storage cavity communicating with a delivery duct through the first cavity, and wherein the capacitive arrangement includes two metal parts, one of which being disposed in the immediate vicinity and opposite at least part of said second cavity.

9. A method according to Claim 1, wherein the reservoir comprises a chamber delimiting said cavity, a product discharge duct connected to an outlet of the reservoir, and a print head, and wherein the capacitive arrangement includes two metal parts, one of which being disposed in the immediate vicinity of a portion of said chamber, and the other one of which is formed by said print head.

10. A method according to Claim 9, wherein a measurement range of possible values which can be taken by the measurement signal when the quantity of product varies within a given range is identified, and an abnormality procedure is triggered when the instantaneous value of said measurement signal is outside said measurement range.

11. A method according to Claim 1, wherein said amplitude level is chosen so that the operating range contains at least values of the quantity of product representing from 0% to 60% of the maximum quantity of product.

12. A method according to Claim 11, wherein said amplitude level is equal to approximately 50% of the height of the resonance peak when the quantity of product is at a minimum.

13. A method according to Claim 1, wherein the excitation signals are alternating signals.

14. A method according to Claim 1, wherein the reservoir contains an electrically conductive ink and is constructed to be used in a printing machine having a casing, and wherein the resonant circuit, including at least one metal part opposite to and in the immediate vicinity of part of the reservoir, is fixed with respect to said casing.

15. A device for determining the quantity of an electrically conductive product contained in a reservoir made of electrically insulating material, comprising:

a resonant circuit including a capacitive arrangement comprised of at least part of said reservoir, said resonant circuit having, for various possible values of the quantity of product contained in a given operating range, resonant frequencies contained within a predetermined frequency range;

an excitation signal generator connected to the resonant circuit and constructed to generate frequencies within the predetermined frequency range;

UNITED STATES PATENT AND TRADEMARK OFFICE
CERTIFICATE OF CORRECTION

PATENT NO. : 6,351,716 B1
DATED : February 26, 2002
INVENTOR(S) : Marie-Hélène Froger et al.

It is certified that error appears in the above-identified patent and that said Letters Patent is hereby corrected as shown below:

Column 12, line 21 - Column 20, line 25 (cont'd), measurement and processing means connected to said resonant circuit and to said excitation signal generator and constructed to apply to the resonant circuit a plurality of excitation signals having various frequencies within the predetermined frequency range, to detect a measurement signal in response to each excitation signal, and to measure the width, for a given amplitude level, of the resonance peak and to derive therefrom an item of information representing the quantity of product contained in the storage cavity, the amplitude level being chosen so that there exists an unequivocal correlation law between width of the resonance peak and the item of information when the quantity of product is within the operating range; and means for capturing the instantaneous value of said item of information.

16. A device according to Claim 15, wherein the resonant circuit is constructed to have a resonant frequency which varies with the quantity of product contained in the storage chamber, within the operating range, in a range from approximately 1 kHz to approximately 100 kHz.

17. A device according to Claim 15, wherein the resonant circuit includes a notional inductor.

18. A device according to Claim 17, wherein the notional inductor is a circuit of the "gyrator" type.

19. A device according to Claim 17, wherein said capacitive arrangement and the notional inductor are distinct from each other.

20. A device according to Claim 15, wherein the resonant circuit is of the parallel type.

21. A device according to Claim 20, wherein said resonant circuit includes a capacitive arm and an inductive arm connected between a measuring point and earth.

22. A device according to Claim 15, wherein the reservoir has a first storage cavity containing a porous body and a second storage cavity communicating with a discharge duct through the first cavity, and wherein the capacitive arrangement includes two metal parts, one of which being disposed in the immediate vicinity of and opposite said second cavity.

23. A device according to Claim 15, wherein the reservoir comprises a chamber delimiting said cavity, a product delivery duct connected to an outlet of the reservoir, and a print head, and wherein the capacitive arrangement includes two metal parts, one of which being disposed in the immediate vicinity of a portion of said chamber, and the other one of which being formed by said print head.

24. A device according to Claim 23, further comprising means for storing data identifying a measurement range of possible values which can be taken by the measurement signal when the quantity of product varies within a given range, and means for triggering an abnormality procedure when the instantaneous value of said measurement signal is outside the measurement range.

UNITED STATES PATENT AND TRADEMARK OFFICE
CERTIFICATE OF CORRECTION

PATENT NO. : 6,351,716 B1
DATED : February 26, 2002
INVENTOR(S) : Marie-Hélène Froger et al.

It is certified that error appears in the above-identified patent and that said Letters Patent is hereby corrected as shown below:

Column 12, line 21 - Column 20, line 25 (cont'd),

25.    A device according to Claim 15, wherein said amplitude level is chosen so that the operating range contains at least values of the quantity of product representing from 0% to 60% of the maximum quantity of product.

26.    A device according to Claim 25, wherein said amplitude level is at least equal to approximately 50% of the height of the resonance peak when the quantity of product is at a minimum.

27.    A device according to Claim 15, wherein the excitation signal generator is an alternating signal generator.

28.    A device according to Claim 15, wherein the reservoir contains an electrically conductive ink and is constructed to be used in a printing machine having a casing, and wherein the resonant circuit, including at least one metal part opposite to and in the immediate vicinity of a part of the reservoir, is mounted fixedly on the casing.

29.    A signal processing device constructed to cooperate with:

a reservoir containing an electrically conductive product and produced from an electrically insulating material;

a resonant circuit including a capacitive arrangement comprised of at least part of said reservoir, said resonant circuit having, for various possible values of the quantity of product contained in a given operating range, resonant frequencies contained within a predetermined frequency range; and an excitation signal generator connected to the resonant circuit and constructed to generate frequencies within the predetermined frequency range;

said signal processing device comprising:

measurement and processing means connected to said resonant circuit and to said excitation signal generator and constructed to apply to the resonant circuit a plurality of excitation signals having various frequencies within the predetermined frequency range, to detect a measurement signal in response to each excitation signal, and to measure the width, for a given amplitude level, of the resonance peak and to derive therefrom an item of information representing the quantity of product contained in the storage cavity, the amplitude level being chosen so that there exists an unequivocal correlation law between width of the resonance peak and the item of information when the quantity of product is within the operating range; and means for capturing the instantaneous value of said item of information.

UNITED STATES PATENT AND TRADEMARK OFFICE
CERTIFICATE OF CORRECTION

PATENT NO.      : 6,351,716 B1                                              Page 5 of 11
DATED           : February 26, 2002
INVENTOR(S)     : Marie-Hélène Froger et al.

It is certified that error appears in the above-identified patent and that said Letters Patent is hereby corrected as shown below:

Column 12, line 21 - Column 20, line 25 (cont'd),

30. A device for supplying electrically conductive product comprising:

a reservoir containing the electrically conductive product and produced from electrically insulating material; and a device for determining the quantity of product contained in the reservoir according to Claim 15.

31. An image formation device having a reservoir containing an electrically conductive marking product and produced from electrically insulating material; and a device for determining the quantity of product contained in the reservoir according to Claim 15.

32. A printing system having an electrically conductive ink reservoir, a print head connected to said ink reservoir, control means connected to said print head, and a device according to Claim 15.

33. An office machine constructed to receive an ink reservoir, and having a device for determining the quantity of product contained in said ink reservoir according to Claim 15.

34. An office signal processing unit constructed to cooperate with an ink reservoir, an excitation signal generator, and a resonant circuit connected to said excitation signal generator and including a capacitive arrangement comprised of at least part of said ink reservoir, said office signal processing unit having a processing device according to Claim 29.

35. A method of determining the quantity of an electrically conductive product contained in a reservoir made of electrically insulating material, said reservoir having a storage chamber and a product delivery duct and being provided with an electrically conductive ejection head connected to the product delivery duct, comprising:

forming a resonant circuit having an arm including a capacitor comprised of at least part of said reservoir and an arm including a notional inductor, said arms being connected in parallel between a measuring point and a reference potential, the capacitor having two conductive elements forming electrodes, one of which being in the immediate vicinity of the storage chamber and the other one of which being formed by the ejection head;

connecting said resonant circuit to an excitation signal generator;

UNITED STATES PATENT AND TRADEMARK OFFICE
CERTIFICATE OF CORRECTION

PATENT NO. : 6,351,716 B1
DATED : February 26, 2002
INVENTOR(S) : Marie-Hélène Froger et al.

It is certified that error appears in the above-identified patent and that said Letters Patent is hereby corrected as shown below:

Column 12, line 21 - Column 20, line 25 (cont'd), defining a measurement procedure according to which at least one excitation signal is applied to the resonant circuit and a measuring signal is measured at the point of measurement in response to each excitation signal;

defining a processing procedure including identifying a characteristic of the resonant circuit from each such measurement signal and deriving therefrom an item of information representing the quantity of product contained in the storage cavity, the characteristic being chosen so that there is an unequivocal correlation law between the characteristic and the item of information; and effecting at least one determination cycle including triggering the measurement procedure and the processing procedure, and capturing the instantaneous value of the item of information.

36. A method according to Claim 35, wherein the arm including the notional inductor is constructed so that the resonant circuit has a resonant frequency which varies with the quantity of product contained in the storage chamber within a range from around 1 kHz to around 100 kHz.

37. A method according to Claim 35, wherein the measurement procedure includes a preliminary step of identifying a frequency range within which the resonant frequency of the resonant circuit varies when the quantity of product contained in the storage chamber varies, and an applying step of applying, to the resonant circuit, a succession of excitation signals having different frequencies chosen in the frequency range and measuring a measurement signal for each such frequency .

38. A method according to Claim 37, wherein, according to the processing procedure, the instantaneous resonant frequency of the resonant circuit is identified as the characteristic.

39. A method according to Claim 37, wherein, according to the processing procedure, the instantaneous resonant frequency of the resonant circuit is identified and the amplitude of the measurement signal corresponding to the instantaneous resonant frequency is identified as the characteristic.

40. A method according to Claim 35, wherein, according to the processing procedure, an excitation signal of predetermined frequency is applied to the resonant circuit and the amplitude of the measurement signal in response to the excitation signal is identified as the characteristic.

41. A method according to Claim 40, wherein the predetermined frequency is chosen so as to be substantially equal to the resonant frequency of the resonant circuit when the storage chamber contains an extreme quantity of product.

UNITED STATES PATENT AND TRADEMARK OFFICE
CERTIFICATE OF CORRECTION

| | |
|---|---|
| PATENT NO. | : 6,351,716 B1 |
| DATED | : February 26, 2002 |
| INVENTOR(S) | : Marie-Hélène Froger et al. |

It is certified that error appears in the above-identified patent and that said Letters Patent is hereby corrected as shown below:

<u>Column 12, line 21 - Column 20, line 25 (cont'd),</u>

42.     A method according to Claim 41, wherein the predetermined frequency is the resonant frequency of the resonant circuit when the storage chamber contains a maximum quantity of product.

43.     A method according to Claim 35, wherein the arm including the notional inductor is a circuit of the "gyrator" type.

44.     A method according to Claim 35, wherein said reference potential is chosen so as to be equal to ground .

45.     A method according to Claim 35, wherein the reservoir includes a first storage cavity containing a porous body and a second storage cavity communicating with the delivery duct through the first cavity, the electrode disposed in the immediate vicinity of the storage chamber being opposite at least part of the second cavity.

46.     A method according to Claim 35, wherein the excitation signal is an alternating signal.

47.     A method according to Claim 35, wherein an identification is made of an operating range of possible values which can be taken by the characteristic when the quantity of product varies within a given range, and an abnormality procedure is triggered when the instantaneous value of the characteristic is outside the operating range.

48.     A method according to Claim 35, wherein the reservoir contains an electrically conductive ink and is constructed to be used in a printing machine having a casing, and wherein the resonant circuit, including the electrode situated in the immediate vicinity of the storage chamber, is fixed with respect to said casing.

49.     A device for determining the quantity of an electrically conductive product contained in a reservoir made of electrically insulating material, said reservoir having a storage chamber and a product delivery duct and being provided with an electrically conductive ejection head connected to the product delivery duct, comprising:
          a resonant circuit having a first arm comprised of at least part of the reservoir and a second arm including a notional inductor, the first and second arms being connected in parallel between a measurement point and a reference potential, the first arm having a first electrical conductor in the immediate vicinity of the storage chamber and a means for connecting said ejection head to the reference potential, the first electrical conductor and said ejection head defining a dielectric space containing at least part of the storage chamber and the product delivery duct and thus forming a capacitor;

an excitation signal generator connected to the resonant circuit;

UNITED STATES PATENT AND TRADEMARK OFFICE
CERTIFICATE OF CORRECTION

PATENT NO.    : 6,351,716 B1
DATED         : February 26, 2002
INVENTOR(S)   : Marie-Hélène Froger et al.

It is certified that error appears in the above-identified patent and that said Letters Patent is hereby corrected as shown below:

Column 12, line 21 - Column 20, line 25 (cont'd), measurement and processing means connected to the measurement point and to said excitation signal generator and constructed to apply at least one excitation signal to the resonant circuit, to detect a measurement signal in response to each such excitation signal, to identify a characteristic of the resonant circuit from each such measurement signal, and to derive therefrom an item of information representing the quantity of product contained in the storage cavity, the characteristic being chosen so that there is an unequivocal correlation law between the characteristic and the item of information;

means for capturing the instantaneous value of the item of information.

50. A device according to Claim 49, wherein the arm including the notional inductor is constructed so that the resonant circuit has a resonant frequency which varies with the quantity of product contained in the storage chamber within a range of around 1 kHz to around 100 kHz.

51. A device according to Claim 49, wherein the measurement and processing means is constructed to apply to the resonant circuit a succession of excitation signals having different frequencies chosen within a frequency range, and to measure a measurement signal for each frequency, the frequency range containing resonant frequencies of the resonant circuit for a plurality of possible values of the quantity of product contained in the reservoir.

52. A device according to Claim 51, wherein the measurement and processing means is constructed to identify as a characteristic the instantaneous resonant frequency of the resonant circuit.

53. A device according to Claim 51, wherein the measurement and processing means is constructed to identify the instantaneous resonant frequency of the resonant circuit and to identify as the characteristic the amplitude of the measurement signal corresponding to the instantaneous resonant frequency.

54. A device according to Claim 49, wherein the measurement and processing means is constructed to apply to the resonant circuit an excitation signal of predetermined frequency and to identify as the characteristic the amplitude of the measurement signal in response to the excitation signal.

55. A device according to Claim 54, wherein the predetermined frequency is substantially equal to the resonant frequency of the resonant circuit when the storage chamber contains an extreme quantity of product.

56. A device according to Claim 55, wherein the predetermined frequency is the resonant frequency of the resonant circuit when the storage chamber contains a maximum quantity of product.

57. A device according to Claim 49, wherein the second arm is a circuit of the "gyrator" type.

UNITED STATES PATENT AND TRADEMARK OFFICE
CERTIFICATE OF CORRECTION

PATENT NO. : 6,351,716 B1
DATED : February 26, 2002
INVENTOR(S) : Marie-Hélène Froger et al.

It is certified that error appears in the above-identified patent and that said Letters Patent is hereby corrected as shown below:

Column 12, line 21 - Column 20, line 25 (cont'd),

58.    A device according to Claim 49, wherein said reference potential is ground.

59.    A device according to Claim 49, wherein the reservoir has a first storage cavity containing a porous body and a second storage cavity communicating with the product delivery duct through the first cavity, said first electrical conductor being disposed opposite the second storage cavity.

60.    A device according to Claim 49, wherein the excitation signal is an alternating signal.

61.    A device according to Claim 49, wherein said measurement and processing means is constructed to detect a case where the characteristic has a value which does not correspond to a possible value of the quantity of product contained in the reservoir, and to then trigger an abnormality procedure.

62.    A signal processing device constructed to cooperate with:

a reservoir containing an electrically conductive product and produced from an electrically insulating material, said reservoir having a storage chamber and a product delivery duct and being provided with an electrically conductive ejection head connected to the product delivery duct;

a resonant circuit having a first arm comprised of at least part of the reservoir and a second arm including a notional inductor, the first and second arms being connected in parallel between a measurement point and a reference potential, the first arm having a first electrical conductor in the immediate vicinity of the storage chamber and a means for connecting said ejection head to the reference potential, the first electrical conductor and said ejection head defining a dielectric space containing at least part of the storage chamber and the product delivery duct and thus forming a capacitor; and an excitation signal generator connected to the resonant circuit;

said processing device comprising:

measurement and processing means designed to be connected to the measurement point and to said excitation signal generator and constructed to apply at least one excitation signal to the resonant circuit, to detect a measurement signal in response to each such excitation signal, to identify a characteristic of the resonant circuit from each such measurement signal, and to derive therefrom an item of information representing the quantity of product contained in the storage cavity, the characteristic being chosen so that there is an unequivocal correlation law between the characteristic and the item of information; and means for capturing the instantaneous value of the item of information.

UNITED STATES PATENT AND TRADEMARK OFFICE
CERTIFICATE OF CORRECTION

| | | |
|---|---|---|
| PATENT NO. | : 6,351,716 B1 | Page 10 of 11 |
| DATED | : February 26, 2002 | |
| INVENTOR(S) | : Marie-Hélène Froger et al. | |

It is certified that error appears in the above-identified patent and that said Letters Patent is hereby corrected as shown below:

Column 12, line 21 - Column 20, line 25 (cont'd),

63. A device for supplying an electrically conductive product comprising:

a reservoir containing the electrically conductive product and produced from an electrically insulating material, said reservoir having a storage chamber and a product delivery duct and being provided with an electrically conductive ejection head connected to said duct;

control means connected to said ejection head; and a device for determining the quantity of product contained in the reservoir in accordance with Claim 49.

64. An image formation device comprising:

a reservoir containing an electrically conductive marking product and produced from an electrically insulating material, said reservoir having a storage chamber and a product delivery duct and being provided with an electrically conductive ejection head connected to said product delivery duct;

control means connected to said ejection head; and a device for determining the quantity of product contained in the reservoir in accordance with Claim 49.

65. A printing system having an electrically conductive ink reservoir and a device according to Claim 49.

66. An office machine constructed to receive an ink reservoir, and having a device for determining the quantity of product contained in said ink reservoir according to Claim 49.

67. An office signal processing unit constructed to cooperate with an ink reservoir which has a storage chamber and a product delivery duct and which is provided with an ejection head connected to the product delivery duct, an excitation signal generator, and a resonant circuit connected to said excitation signal generator and having a first arm including at least part of the reservoir and a second arm including a notional inductor, said first and second arms being connected in parallel between a measuring point and a reference potential, said first arm including a first electrical conductor disposed in the immediate vicinity of the storage chamber and a means for connecting the ejection head to the reference potential, the first electrical conductor and the ejection head defining a dielectric space containing at least part of the storage chamber and the product delivery duct and thus forming a capacitor, said office unit including a signal processing device according to Claim 62.

68. A storage medium storing a program for determining the quantity of an electrically conductive product contained in a reservoir made of an electrically insulating material, said program implementing the steps of the method of claim 1.

UNITED STATES PATENT AND TRADEMARK OFFICE
CERTIFICATE OF CORRECTION

PATENT NO. : 6,351,716 B1
DATED : February 26, 2002
INVENTOR(S) : Marie-Hélène Froger et al.

It is certified that error appears in the above-identified patent and that said Letters Patent is hereby corrected as shown below:

<u>Column 12, line 21 - Column 20, line 25 (cont'd),</u>

69. A storage medium according to claim 68, wherein said storage medium is detachably mountable in a device for determining the quantity of an electrically conductive product contained in a reservoir made of an electrically insulating material.

70. A storage medium according to claim 68, wherein said storage medium is a floppy disk or a CD-ROM.

71. A storage medium storing a program for determining the quantity of an electrically conductive product contained in a reservoir made of an electrically insulating material, said program implementing the steps of the method of claim 35.

72. A storage medium according to claim 71, wherein said storage medium is detachably mountable in a device for determining the quantity of an electrically conductive product contained in a reservoir made of an electrically insulating material.

73. A storage medium according to claim 71, wherein said storage medium is a floppy disk or a CD-ROM.--

Signed and Sealed this

Thirtieth Day of August, 2005

JON W. DUDAS
*Director of the United States Patent and Trademark Office*